(12) United States Patent
Furukawa et al.

(10) Patent No.: US 10,592,499 B2
(45) Date of Patent: Mar. 17, 2020

(54) INFORMATION PROCESSING APPARATUS AND NON-TRANSITORY COMPUTER READABLE MEDIUM

(71) Applicant: FUJI XEROX CO., LTD., Tokyo (JP)

(72) Inventors: Shigehiro Furukawa, Kanagawa (JP); Tomoyuki Ito, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 182 days.

(21) Appl. No.: 15/915,149

(22) Filed: Mar. 8, 2018

(65) Prior Publication Data
US 2019/0057127 A1 Feb. 21, 2019

(30) Foreign Application Priority Data
Aug. 15, 2017 (JP) .................................. 2017-156693

(51) Int. Cl.
| | | |
|---|---|---|
| *G06F 16/23* | (2019.01) | |
| *G06F 16/26* | (2019.01) | |
| *G06F 16/28* | (2019.01) | |
| *G06F 16/22* | (2019.01) | |
| *G06F 16/901* | (2019.01) | |

(52) U.S. Cl.
CPC ...... *G06F 16/2365* (2019.01); *G06F 16/2282* (2019.01); *G06F 16/26* (2019.01); *G06F 16/288* (2019.01); *G06F 16/9024* (2019.01)

(58) Field of Classification Search
CPC .... G06F 16/2365; G06F 16/26; G06F 16/288; G06F 16/2282; G06F 16/9024
See application file for complete search history.

(56) References Cited

FOREIGN PATENT DOCUMENTS

JP 2016-081185 A 5/2016

*Primary Examiner* — Etienne P Leroux
(74) *Attorney, Agent, or Firm* — Sughrue Mion, PLLC

(57) ABSTRACT

An information processing apparatus includes a first association unit that associates a deployment table and a relations diagram with each other, a second association unit that associates an axis item, which is an item included in an axis of the deployment table, and an item in the relations diagram with each other, a third association unit that associates cause-and-effect information indicating a cause-and-effect relationship between two axis items of adjacent axes of the deployment table and an arrow connecting items to each other in the relations diagram with each other, and a display unit that displays, using at least one of the first to third association units, a relations diagram associated with a deployment table that is a correction target.

12 Claims, 22 Drawing Sheets

FIG. 9

| | | |
|---|---|---|
| 905 | RELATIONS DIAGRAM ID | |
| 910 | RELATIONS DIAGRAM NAME | |
| 915 | USER | |
| 920 | TIME | |
| 925 | NUMBER OF ITEMS | |
| 930 | ITEM ID | |
| | ⋮ | |
| 935 | NUMBER OF ARROWS | |
| 940 | ARROW ID | |
| | ⋮ | |

| | | |
|---|---|---|
| 1005 | ITEM ID | |
| 1010 | DETAILS OF ITEM | |
| 1015 | NUMBER OF EFFECT ITEMS | |
| 1020 | EFFECT ITEM ID | |
| | ⋮ | |

| | | |
|---|---|---|
| 1105 | ARROW ID | |
| 1110 | CAUSE ITEM ID | |
| 1115 | EFFECT ITEM ID | |
| 1120 | ATTRIBUTE | |

| | |
|---|---|
| 1205 — DEPLOYMENT TABLE ID | |
| 1210 — DEPLOYMENT TABLE NAME | |
| 1215 — USER | |
| 1220 — TIME | |
| 1225 — BASE RELATIONS DIAGRAM ID | |
| 1230 — AXIS A NAME | |
| 1235 — NUMBER OF AXIS ITEMS | |
| 1240 — AXIS ITEM ID | |
| ⋮ | |
| 1245 — NUMBER OF PIECES OF CAUSE-AND-EFFECT INFORMATION | |
| 1250 — CAUSE-AND-EFFECT INFORMATION ID | |
| ⋮ | |

| | |
|---|---|
| 1305 — AXIS ITEM ID | |
| 1310 — AXIS ITEM NAME | |
| 1315 — AXIS | |

| | |
|---|---|
| 1405 — CAUSE-AND-EFFECT INFORMATION ID | |
| 1410 — AXIS ITEM ID (A) | |
| 1415 — AXIS ITEM ID (B) | |
| 1420 — ATTRIBUTE | |

1400

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-156693 filed Aug. 15, 2017.

BACKGROUND

Technical Field

The present invention relates to an information processing apparatus and a non-transitory computer readable medium.

SUMMARY

According to an aspect of the invention, there is provided an information processing apparatus including a first association unit that associates a deployment table and a relations diagram with each other, a second association unit that associates an axis item, which is an item included in an axis of the deployment table, and an item in the relations diagram with each other, a third association unit that associates cause-and-effect information indicating a cause-and-effect relationship between two axis items of adjacent axes of the deployment table and an arrow connecting items to each other in the relations diagram with each other, and a display unit that displays, using at least one of the first to third association units, a relations diagram associated with a deployment table that is a correction target.

BRIEF DESCRIPTION OF THE DRAWINGS

An exemplary embodiment of the present invention will be described in detail based on the following figures, wherein:

FIG. 9 is a diagram illustrating an example of the data structure of a relations diagram information table;

FIG. 10 is a diagram illustrating an example of the data structure of an item information table;

FIG. 11 is a diagram illustrating an example of the data structure of an arrow information table;

FIG. 12 is a diagram illustrating an example of the data structure of a deployment table information table;

FIG. 13 is a diagram illustrating an example of the data structure of an axis item information table;

FIG. 14 is a diagram illustrating an example of the data structure of a cause-and-effect information table;

DETAILED DESCRIPTION

Before an exemplary embodiment is described, an information processing apparatus that forms a basis of the exemplary embodiment will be described. The following description will facilitate understanding of the exemplary embodiment.

There is a technique in which a relations diagram is created on the basis of definitions of functional items, processes, and dependence between the functional items and a deployment table is generated from the created relations diagram. A technique disclosed in Japanese Unexamined Patent Application Publication No. 2016-081185 provides an information processing apparatus and an information processing program that classify functional items for each process and that make it easier to create tables (hereinafter referred to as "deployment tables") relating to development of quality functions than when classified functional items are layered.

A deployment table is created not only for a single technical process, subsystem, or technical problem but also in order to reconcile plural technical processes, subsystems, or technical problems. As a result of the reconciliation, dependence or cause-and-effect relationships are reviewed, and the deployment table is edited. A relations diagram is created in order to review dependence or cause-and-effect relationships or at a beginning of examination of a technical problem, but the deployment table does not necessarily reflect all items of the created relations diagram and includes only specified items as axis items thereof. That is, the relations diagram includes, unlike the deployment table, information that is not converted. Even if the deployment table is edited, therefore, the relations diagram does not reflect a result of the editing, and an inconsistency occurs between the relations diagram and the deployment table. Because information regarding the deployment table and the relations diagram is utilized as knowledge and design resources, a user might be confused if the information is inconsistent even through the information has been created for the same technique.

A relations diagram can be created in such a way as to be mutually convertible with a deployment table, but in this case, the relations diagram is created under restrictions and therefore loses an advantage thereof in facilitating thinking.

In the following exemplary embodiment, even if a deployment table generated from a relations diagram created without restrictions is edited, the relations diagram and the deployment table reflect a result of the editing.

An exemplary embodiment of the present invention will be described hereinafter on the basis of the drawings.

Figure 1:
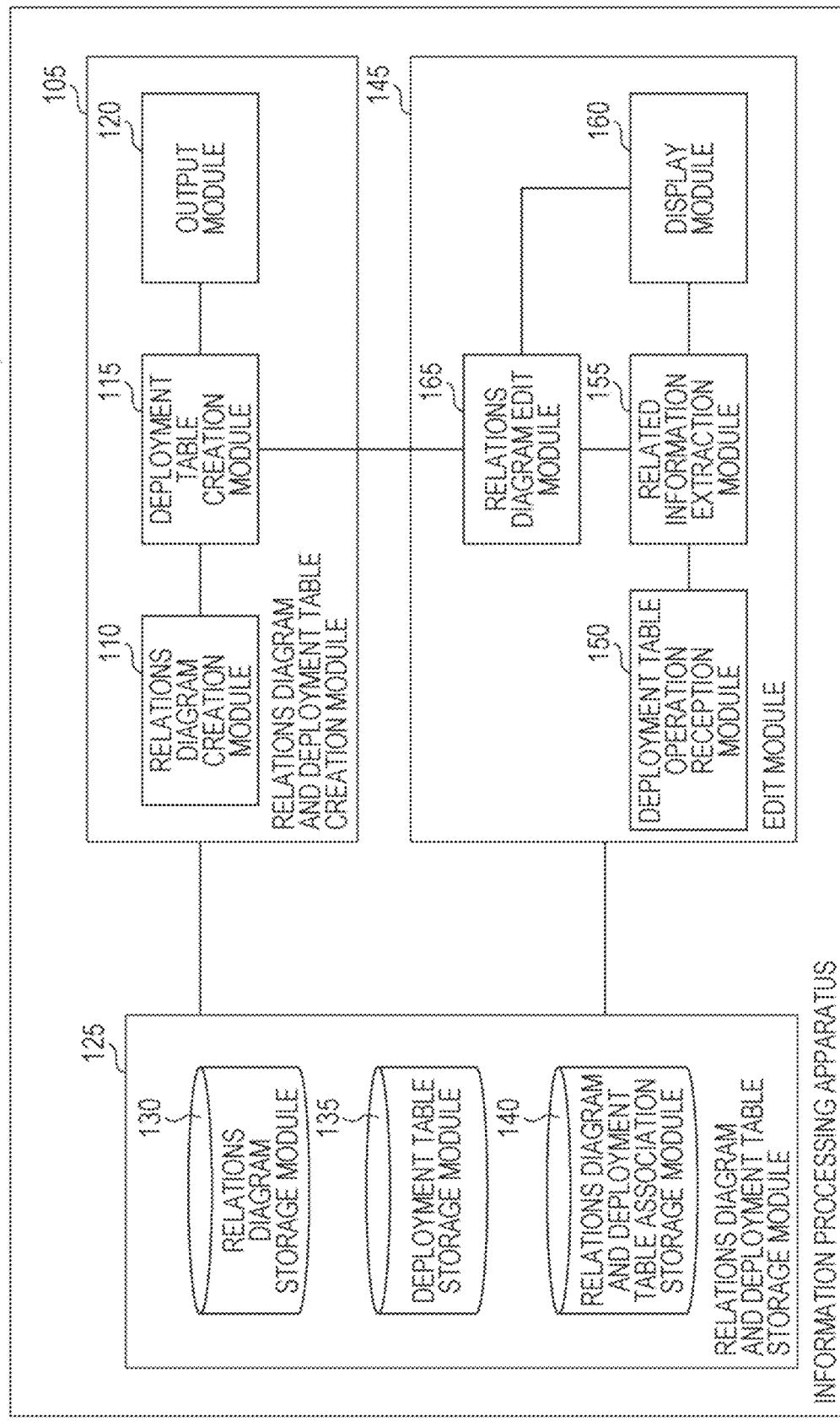
FIG. 1 is a conceptual diagram illustrating the configuration of modules according to an exemplary embodiment.

FIG. 1 is a conceptual diagram illustrating the configuration of modules according to the present exemplary embodiment.

Modules generally refer to logically separable software (computer program) or hardware components. The modules in the present exemplary embodiment therefore include not only modules of computer programs but also modules of hardware components. The present exemplary embodiment also applies to computer programs (a program for causing a computer to perform steps, a program for causing the computer to function as units, and a program for causing the computer to achieve functions), a system, and a method for achieving these modules. Although terms "store" and "stored" and other equivalent terms will be used for convenience of description, these terms mean that, when the exemplary embodiment implements the present invention as computer programs, the computer programs are stored in a storage device or the storage device is controlled in such a way as to store the computer programs. The modules may be in one-to-one correspondence with functions, but in practice, one module may be achieved by one program, plural modules may be achieved by one program, or one module may be achieved by plural programs. Plural modules may be executed by one computer, or one module may be executed by plural computers in distributed or parallel computing. One module may include another module. In the following description, a term "connection" will be used not only for a physical connection but also for a logical connection (communication of data, issuance of instructions, reference relationships of data, etc.). A term "predetermined" means that something is determined prior to processing in question, and may be used whenever something is determined prior to processing in question depending on a situation or a state at the time or a situation or a state so far regardless of whether something is determined before a process according to the present exemplary starts or during the process. When there are plural predetermined values, the values may be different from one another or two or more values (or all values, obviously) may be the same. A sentence "If something is A, B is performed" means that it is determined whether something is A, and if so, B is performed. This, however, excludes a case where the determination whether something is A need not be made. In addition, when items are enumerated like "A, B, and C", these items are enumerated as examples unless otherwise specified, and a case is possible where only one of them (e.g., only A) is selected.

A system or an apparatus may be achieved by plural computers, plural pieces of hardware, plural apparatuses, or the like connected to one another through a communication medium such as a network (includes a one-to-one connection) or may be achieved by a single computer, a single piece of hardware, a single apparatus, or the like. Terms "apparatus" and "system" will be used as synonyms. Needless to say, the term "system" does not imply a social mechanism (social system), which is based on a human agreement.

Target information is read from a storage device before a process or each of plural process performed by a module, and a result of the process is written to the storage device after the process is completed. Description of the reading of information before a process and the writing of a result to the storage device after a process might be omitted. The storage device may be a hard disk, a random-access memory (RAM), an external storage medium, a storage device through a communication line, a register of a central processing unit (CPU), or the like.

An information processing apparatus 100 according to the present exemplary embodiment edits relations diagrams and deployment tables and, as illustrated in the example illustrated in FIG. 1, includes a relations diagram and deployment table creation module 105, a relations diagram and deployment table storage module 125, and an edit module 145.

Figure 5:
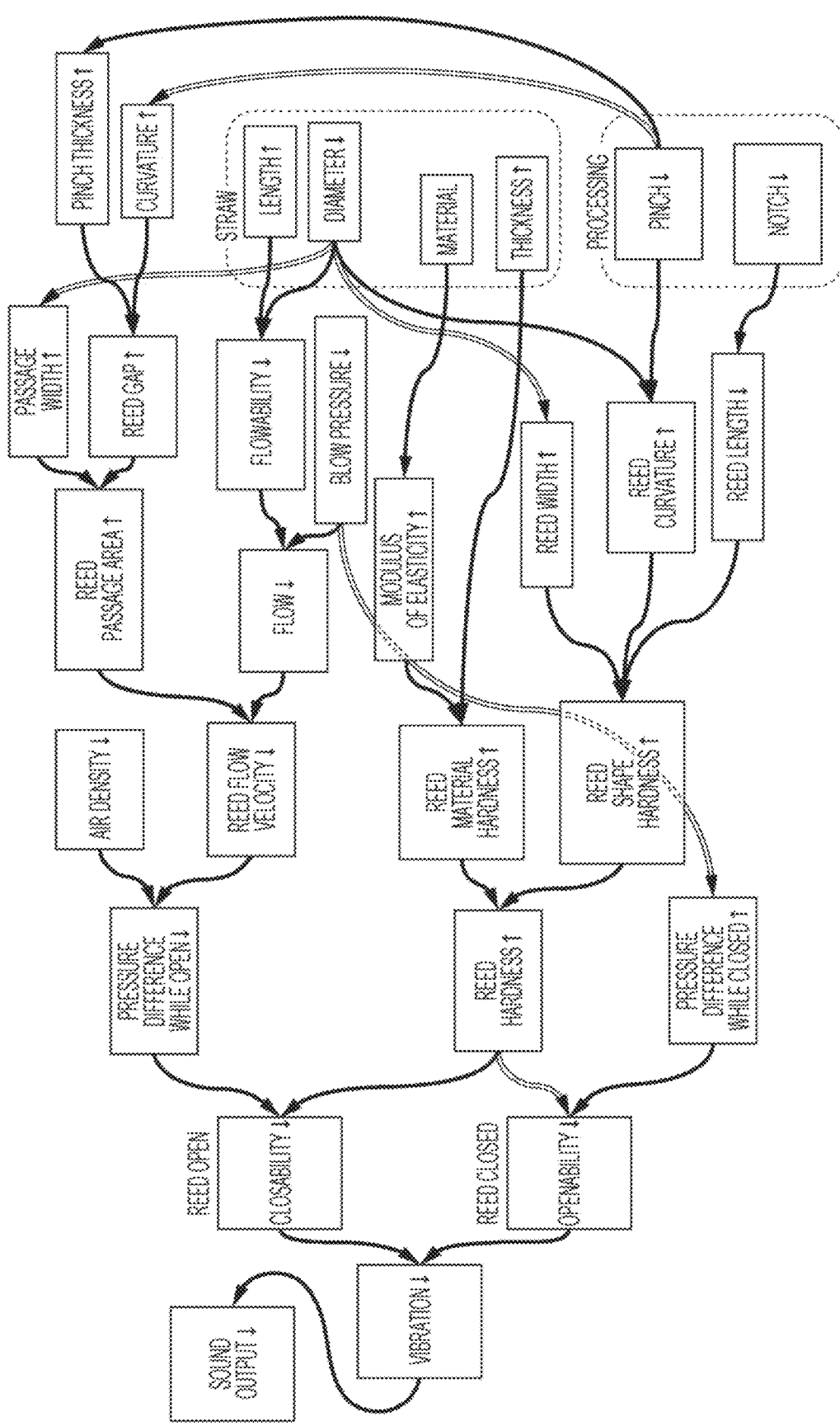
FIG. 5 is a diagram illustrating an example of a relations diagram.

A relations diagram is used to clarify cause-and-effect relationships when a problem to be addressed has been identified but causes of the problem are complex. As illustrated in FIG. 5, a relations diagram includes items and arrows. The items correspond to nodes (vertices) in a graph theory. The arrows correspond to edges (branches) in the graph theory.

Definitions of terms will be described.

A "system" is a mechanism in which plural elements are configured to together achieve a certain operation while interacting with one another. Any system is a subsystem of a larger system.

A "customer" is a person or an organization who receives a value of a provided system and who pays for the system. A step after development or production is also a customer.

A "quality" refers to a property subjected to evaluation for determining a satisfaction level of a customer toward a service.

An "indicator" is information used to determine or evaluate a target.

A "factor" is an entity that can affect (contribute to) an event. The term is often used in a statistical field such as quality engineering.

A "prime factor" is a factor that affects an event so greatly that it is difficult to ignore.

A "cause" is a factor that has actually caused (causes) an event.

A "property" is an adjective indicating an intrinsic state of a target (e.g., "hard", "thin", or "beautiful"). "Intrinsic" means that a property in question is originally intended or innate, not accidental.

A "behavior" is a verb indicating a change in a state of a target (e.g., "move", "charge", or "conduct"). In many cases, a behavior is accompanied by an adverb indicating a degree of the change (e.g., "fast", "strongly", or "much").

An "action" is a noun indicating an effect of a target upon another thing or an effect received from another thing or an adverb indicating a degree of the effect (e.g., heating, thermal storage, pressure, or oxidation).

A "characteristic" is an indicator of a property, a behavior, or an action.

A "function" is a property, a behavior, or an action that is a unique role of each component of a system. A function is something that manifests, and something that exists or does not exist. In quality engineering, an "objective function"

refers to an operation for achieving an object of a system, and a "generic function" refers to an operation for technically supporting the achievement of an objective function.

"Performance" is a quantitative indicator of a function. That is, performance is a quantitative indicator indicating a degree of a property, a behavior, or an action. Performance is something achieved, and can be high or low.

The relations diagram and deployment table creation module 105 includes a relations diagram creation module 110, a deployment table generation module 115, and an output module 120 and is connected to the relations diagram and deployment table storage module 125. The relations diagram and deployment table creation module 105 creates a relations diagram, generates a deployment table from the relations diagram, and outputs the relations diagram and the deployment table. The technique disclosed in Japanese Unexamined Patent Application Publication No. 2016-081185, for example, may be used.

The relations diagram creation module 110 is connected to the deployment table generation module 115. The relations diagram creation module 110 receives information necessary to create a relations diagram. For example, the relations diagram creation module 110 receives information such as a name of a relations diagram, items, details of the items (attribute information regarding the items), and arrows (dependence between the items (dependence information and attribute information regarding the arrows)) created as a result of operations performed, using keys and a mouse, by a user on a user interface displayed on a display device such as a liquid crystal display. The relations diagram creation module 110 can also read information stored in a hard disk (a built-in hard disk of the computer or a one connected through the network) or the like.

For example, the relations diagram creation module 110 receives plural factors, attribute information regarding the factors including processes to which the factors belong, and cause-and-effect relationships between the plural factors and creates or edits a relations diagram.

The deployment table generation module 115 is connected to the relations diagram creation module 110, the output module 120, and a relations diagram edit module 165 of the edit module 145. The deployment table generation module 115 generates a deployment table on the basis of a relations diagram created by the relations diagram creation module 110.

If a display module 160 corrects a displayed relations diagram, the deployment table generation module 115 may generate a deployment table from the corrected relations diagram. That is, the deployment table generation module 115 may generate a deployment table on the basis of a relations diagram edited by the relations diagram edit module 165, instead of a relations diagram created by the relations diagram creation module 110. In this generation process, the deployment table generation module 115 generates a relations diagram identifier (ID) and deployment table ID association table 1500, an item ID and axis item ID association table 1600, and an arrow ID and cause-and-effect information ID association table 1700.

The output module 120 is connected to the deployment table generation module 115. The output module 120 outputs a relations diagram created by the relations diagram creation module 110 (can be a relations diagram edited by the relations diagram edit module 165) and a deployment table generated by the deployment table generation module 115 (can be a deployment table generated on the basis of the relations diagram created by the relations diagram creation module 110 or a deployment table generated on the basis of the relations diagram edited by the relations diagram edit module 165). When the relations diagram and the deployment table are output, for example, the relations diagram and the deployment table are displayed on a display device such as a display, printed by a printing device such as a printer, transmitted by an image transmission device such as a facsimile, written to a storage device such as a database, stored in a storage medium such as a memory card, or transferred to another information processing apparatus.

The relations diagram and deployment table storage module 125 includes a relations diagram storage module 130, a deployment table storage module 135, a relations diagram and deployment table association storage module 140 and is connected to the relations diagram and deployment table creation module 105 and the edit module 145. The relations diagram and deployment table storage module 125 stores information regarding relations diagrams and deployment tables.

The relations diagram storage module 130 stores information regarding relations diagrams. More specifically, for example, the relations diagram storage module 130 stores a relations diagram information table 900, an item information table 1000, and an arrow information table 1100. FIG. 9 is a diagram illustrating an example of the data structure of the relations diagram information table 900. The relations diagram information table 900 includes a relations diagram ID field 905, a relations diagram name field 910, a user field 915, a time field 920, a number of items field 925, item ID fields 930, a number of arrows field 935, and arrow ID fields 940. In the present exemplary embodiment, the relations diagram ID field 905 stores information for uniquely identifying a relations diagram (relations diagram ID). The relations diagram name field 910 stores a name of the relations diagram having the relations ID. The user field 915 stores a user who has created the relations diagram. The time field 920 stores a time point at which the relations diagram has been created (year, month, day, hour, minute, second, decimal, or a combination thereof). The number of items field 925 stores the number of items of the relations diagram. There are as many item ID fields 930 as the number of items indicated in the number of items field 925. In the present exemplary embodiment, the item ID fields 930 store information (item IDs) for uniquely identifying items. The information indicated in the item ID fields 930 is stored in the item information table 1000. The number of arrows field 935 stores the number of arrows of the relations diagram. There are as many arrow ID fields 940 as the number of arrows indicated in the number of arrows field 935. In the present exemplary embodiment, the arrow ID fields 940 store information (arrow IDs) for uniquely identifying arrows. In the present exemplary embodiment, the information indicated in the arrow ID fields 940 is stored in the arrow information table 1100.

FIG. 10 is a diagram illustrating an example of the data structure of the item information table 1000. The item information table 1000 includes an item ID field 1005, a details of item field 1010, a number of effect items field 1015, and effect item ID fields 1020. The item ID field 1005 stores an item ID. The details of item field 1010 stores details (an item name and the like) of an item having the item ID. The number of effect items field 1015 stores the number of items to which the item is connected to. There are as many effect item ID fields 1020 as the number of items indicated in the number of effect items field 1015. The effect item ID fields 1020 store effect item IDs.

FIG. 11 is a diagram illustrating an example of the data structure of the arrow information table 1100. The arrow information table 1100 includes an arrow ID field 1105, a cause item ID field 1110, an effect item ID field 1115, and an attribute field 1120. The arrow ID field 1105 stores an arrow ID. The cause item ID field 1110 stores an item ID of an item from which an arrow extends. The effect item ID field 1115 stores an item ID of an item to which the arrow extends. The attribute field 1120 stores an attribute of the arrow. The attribute can be, for example, a relationship between items connected to each other by the arrow (a relationship in which a value of an effect item increases as a value of a cause item increases (e.g., direct proportion) or a relationship in which a value of an effect item decreases as a value of a cause item increases (e.g., inverse proportion)) or the like.

FIGS. 9 to 11 illustrate examples, and other types of data structure may be used, instead. For example, the data structure of a graph may be used.

The deployment table storage module 135 stores information regarding a deployment table. More specifically, for example, the deployment table storage module 135 stores a deployment table information table 1200, an axis item information table 1300, and a cause-and-effect information table 1400. FIG. 12 is a diagram illustrating an example of the data structure of the deployment table information table 1200. The deployment table information table 1200 includes a deployment table ID field 1205, a deployment table name field 1210, a user field 1215, a time field 1220, a base relations diagram ID field 1225, an axis A name field 1230, a number of axis items field 1235, axis item ID fields 1240, a number of pieces of cause-and-effect information field 1245, and cause-and-effect information ID fields 1250. In the present exemplary embodiment, the deployment table ID field 1205 stores information (deployment table ID) for uniquely identifying a deployment table. The deployment table name field 1210 stores a name of the deployment table having the deployment table ID. The user field 1215 stores a user who has created the deployment table. The time field 1220 stores a time point at which the deployment table has been created. The base relations diagram ID field 1225 stores a relations diagram ID of a relations diagram from which the deployment table has been generated. That is, the base relations diagram ID field 1225 indicates a relations diagram ID of a relations diagram that has been referred to in order to generate the deployment table. The axis A name field 1230 stores an axis A name. For example, the axis A name is a name (quality) of a first axis (quality) 810A illustrated in FIG. 8. The number of axis items field 1235 to the cause-and-effect information ID fields 1250 are provided for the axis A. When there are four axes, the number of axis items field 1235 to the cause-and-effect information ID fields 1250 are also provided for axes B, C, and D. The number of axis items field 1235 stores the number of items of the axis (axis A). There are as many axis item ID fields 1240 as the number of items indicated in the number of axis items field 1235. In the present exemplary embodiment, the axis item ID fields 1240 store information (axis item IDs) for uniquely identifying the axis items. The information indicated in the axis item ID fields 1240 is stored in the axis item information table 1300. The number of pieces of cause-and-effect information field 1245 stores the number of pieces of cause-and-effect information. The cause-and-effect information corresponds to fields (cells) indicated in an example illustrated in FIG. 8 in which "P", "N", and "–" are written. There are as many cause-and-effect information ID fields 1250 as the number of pieces of cause-and-effect information indicated in the number of pieces of cause-and-effect information field 1245. In the present exemplary embodiment, the cause-and-effect information ID fields 1250 store information (cause-and-effect information IDs) for uniquely identifying the pieces of cause-and-effect information. The information indicated in the cause-and-effect information ID fields 1250 is stored in the cause-and-effect information table 1400.

FIG. 13 is a diagram illustrating an example of the data structure of the axis item information table 1300. The axis item information table 1300 includes an axis item ID field 1305, an axis item name field 1310, and an axis field 1315. The axis item ID field 1305 stores an axis item ID. The axis item name field 1310 stores a name of an axis item having the axis item ID. For example, the axis item name field 1310 stores a name (sound stability) of an axis item (sound stability) 810 illustrated in FIG. 8. The axis field 1315 stores an axis to which the axis item belongs.

FIG. 14 is a diagram illustrating an example of the data structure of the cause-and-effect information table 1400. The cause-and-effect information table 1400 includes a cause-and-effect information ID field 1405, an axis item ID (A) field 1410, an axis item ID (B) field 1415, and an attribute field 1420. The cause-and-effect information ID field 1405 stores a cause-and-effect information ID. The axis item ID (A) field 1410 stores an axis item ID (A). The axis item ID (B) field 1415 stores an axis item ID (B). That is, a position at which the axis item ID (A) field 1410 and the attribute field 1420 intersects is a position of the cause-and-effect information in the deployment table. The attribute field 1420 stores an attribute. For example, the attribute is information such as "P+", "P–", "N+", "N–", or "–".

Figure 15:
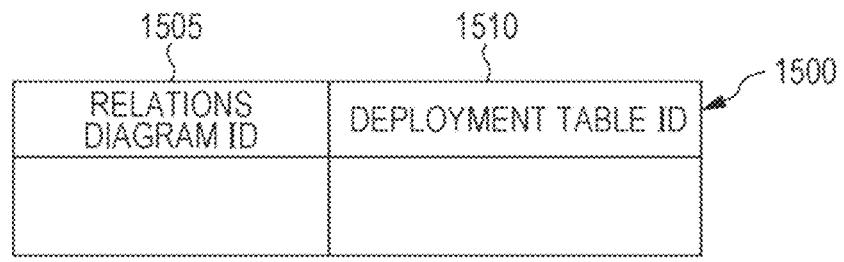
FIG. 15 is a diagram illustrating an example of the data structure of a relations diagram ID and deployment table ID association table.

The relations diagram and deployment table association storage module 140 associates a deployment table and a relations diagram with each other. The relations diagram and deployment table association storage module 140 stores, for example, information for associating a deployment table and a relations diagram with each other. More specifically, for example, FIG. 15 is a diagram illustrating an example of the data structure of the relations diagram ID and deployment table ID association table 1500. The relations diagram ID and deployment table ID association table 1500 includes a relations diagram ID field 1505 and a deployment table ID field 1510. The relations diagram ID field 1505 stores a relation diagram ID. The deployment table ID field 1510 stores a deployment table ID corresponding to the relations diagram ID. More specifically, after the deployment table generation module 115 generates a deployment table from a relations diagram, the relations diagram ID and deployment table ID association table 1500 is generated. A value of the relations diagram ID field is a relation diagram ID indicating the relations diagram from which the deployment table has been generated, and a value of the deployment table ID field 1510 is a deployment table ID indicating the generated deployment table. One relations diagram may correspond to plural deployment tables. This is because plural deployment table can be generated by selecting different items of a relations diagram as axis items.

Figure 16:
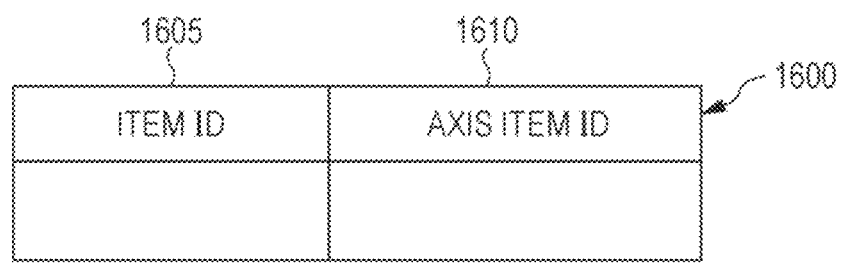
FIG. 16 is a diagram illustrating an example of the data structure of an item ID and axis item ID association table.

The relations diagram and deployment table association storage module 140 associates an axis item, which is an item included in an axis of a deployment table and an item of a relations diagram with each other. The relations diagram and deployment table association storage module 140 stores, for example, information for associating an axis item, which is an item included in an axis of a deployment table, and an item of a relations diagram with each other. More specifically, for example, FIG. 16 is a diagram illustrating an example of the data structure of the item ID and axis item ID association table 1600. The item ID and axis item ID association table 1600 includes an item ID field 1605 and an axis item ID field 1610. The item ID field 1605 stores an item ID. The axis item ID field 1610 stores an axis item ID. More specifically, after the deployment table generation module 115 generates a deployment table from a relations diagram, the item ID and axis item ID association table 1600 is generated. A value of the item ID field 1605 is an item ID indicating an item of a relations diagram from which the deployment table has been generated, and a value of the axis item ID field 1610 is an axis item ID indicating an axis item of the generated deployment table.

Figure 17:
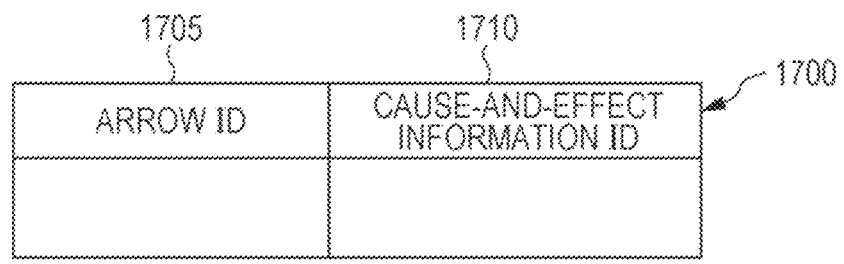
FIG. 17 is a diagram illustrating an example of the data structure of an arrow ID and cause-and-effect information ID association table.

The relations diagram and deployment table association storage module 140 associates cause-and-effect information indicating a cause-and-effect relationship between two axis items of adjacent axes of a deployment table and an arrow connecting items to each other in a relations diagram with each other. The "two axis items of adjacent axes" refer to, when axes A and B are adjacent to each other, an axis item A1 of the axis A and an axis item B1 of the axis B. The relations diagram and deployment table association storage module 140 stores, for example, information for associating cause-and-effect information indicating a cause-and-effect relationship between two axis items of adjacent axes of a deployment table and an arrow connecting items to each other in a relations diagram with each other. More specifically, FIG. 17 is a diagram illustrating an example of the data structure of the arrow ID and cause-and-effect information association table 1700. The arrow ID and cause-and-effect information association table 1700 includes an arrow ID field 1705 and a cause-and-effect information ID field 1710. The arrow ID field 1705 stores an arrow ID. The cause-and-effect information ID field 1710 stores a cause-and-effect information ID. More specifically, after the deployment table generation module 115 generates a deployment table from a relations diagram, the arrow ID and cause-and-effect information association table 1700 is generated. A value of the arrow ID field 1705 is an arrow ID indicating an arrow in the relations diagram from which the deployment table has been generated, and a value of the cause-and-effect information ID field 1710 is a cause-and-effect information ID indicating cause-and-effect information regarding the generated deployment table. One cause-and-effect information ID may correspond to plural arrow IDs. This is because one or more items (items that have not been selected as axis items) can be generated between items depending on how axis items have been selected. More specifically, this is because if items A and C have been selected as axis items but there is an item B between the items A and C (more specifically, if there is no arrow directly connecting the items A and C to each other but there is an arrow connecting the item A to the item B and an arrow connecting the item B to the item C), there is only one piece of cause-and-effect information between axis items A and C in the deployment table but the piece of cause-and-effect information corresponds to the two arrows (the arrow connecting the item A to the item B and the arrow connecting the item B to the item C) in a corresponding relations diagram.

The edit module 145 includes a deployment table operation reception module 150, a related information extraction module 155, a display module 160, and a relations diagram edit module 165 and is connected to the relations diagram and deployment table storage module 125. The edit module 145 edits a deployment table and also edits a relations diagram in accordance with the edited deployment table. After a request to edit a deployment table generated by the deployment table generation module 115 is issued, for example, the edit module 145 extracts a relations diagram corresponding to the deployment table to edit the relations diagram. The edit module 145 generates the deployment table again for the deployment table generation module 115 on the basis of a result of the editing. As a result, the deployment table reflects the result of the editing, and information regarding the relations diagram and the deployment table remains the same.

The deployment table operation reception module 150 is connected to the related information extraction module 155. The deployment table operation reception module 150 receives information regarding editing performed by the user on a deployment table through keys of a keyboard or a mouse. The deployment table operation reception module 150 also reads edit information created in advance stored in a hard disk or the like. For example, the deployment table operation reception module 150 integrates plural axis items of an axis of a deployment table together.

The related information extraction module 155 is connected to the deployment table operation reception module 150, the display module 160, and the relations diagram edit module 165. The related information extraction module 155 extracts a relations diagram from a deployment table, items of the relations diagram from an axis item of the deployment table, and arrows of the relations diagram from cause-and-effect information regarding the deployment table using the relations diagram ID and deployment table ID association table 1500, the item ID and axis item ID association table 1600, and the arrow ID and cause-and-effect information association table 1700 stored in the relations diagram and deployment table association storage module 140. That is, the related information extraction module 155 extracts a relations diagram, items of the relations diagram, and arrows of the relations diagram from a deployment table, an axis item of the deployment table, and cause-and-effect information regarding the deployment table, respectively, that are editing targets of the deployment table operation reception module 150.

The display module 160 is connected to the related information extraction module 155 and the relations diagram edit module 165. The display module 160 displays a relations diagram associated with a deployment table that is a correction target using at least one of the relations diagram ID and deployment table ID association table 1500, the item ID and axis item ID association table 1600, and the arrow ID and cause-and-effect information association table 1700. When a relations diagram is extracted from a deployment table, for example, the relations diagram ID and deployment table ID association table 1500 is used. When items of a relations diagram are extracted from an axis item of a deployment table, the relations diagram ID and deployment table ID association table 1500 and the item ID and axis item ID association table 1600 are used. When arrows of a relations diagram are extracted from cause-and-effect information regarding a deployment table, the relations diagram ID and deployment table ID association table 1500 and the arrow ID and cause-and-effect information association table 1700 are used. When items and arrows of a relations diagram are extracted from an axis item of a deployment table and cause-and-effect information regarding the deployment table, respectively, the relations diagram ID and deployment table ID association table 1500, the item ID and axis item ID association table 1600, and the arrow ID and cause-and-effect information association table 1700 are used. The above expression "a deployment table that is a correction target" means that the deployment table has already been corrected or the correction has not been performed yet. That is, a relations diagram may be displayed after the correction is completed or after a deployment table is selected as a correction target.

The display module 160 may display a relations diagram associated with a deployment table that is a correction target using the relations diagram ID and deployment table ID association table 1500. The display module 160 may display items associated with an axis item that is a correction target using the item ID and axis item ID association table 1600 in a mode different from one for other items. For example, a relations diagram ID of a relations diagram can be extracted from a deployment table ID of a deployment table using the relations diagram ID and deployment table ID association table 1500. Item IDs of the relations diagram can then be extracted from an axis item ID of an axis item of the deployment table using the item ID and axis item ID association table 1600. Here, the "mode" refers to a shape (e.g., a shape of frames surrounding items, such as an ellipse or a rectangle), a pattern (e.g., a background hatching), a color (e.g., a color of frames surrounding items, a color of a background, a color of text indicating items, or the like), a combination thereof, or a dynamic change thereof (e.g., a flash, an animation, or the like). The "other items" refer to items associated with axis items that are not correction targets. It is sufficient that the mode is different from one for the other items.

If plural axis items of an axis of a deployment table are integrated together, the display module 160 may display items of a relations diagram associated with the plural axis items while integrating the items together.

Furthermore, if cause-and-effect information is different between plural axis items to be integrated together and axis items of adjacent axes are different from each other, the display module 160 may display a message indicating that there is an inconsistency.

In addition, the display module 160 may display a relations diagram associated with a deployment table that is a correction target using the relations diagram ID and deployment table ID association table 1500. The display module 160 may display arrows associated with cause-and-effect information that is a correction target in a mode different from one for other arrows using the arrow ID and cause-and-effect information association table 1700.

If plural axis items of an axis of a deployment table are integrated together, the display module 160 may display arrows of a relations diagram associated with cause-and-effect information regarding the axis items while integrating the arrows together.

Furthermore, if attribute information is different between plural arrows to be integrated together in a relations diagram, the display module 160 may display a message indicating that there is an inconsistency.

The display module 160 may also display a message for prompting the user to correct items or arrows displayed in a different mode.

If items other than items displayed in a different mode or arrows other than arrows displayed in a different mode are selected as correction targets, the display module 160 may display a message indicating that the items or the arrows that are not correction targets in a deployment table will be corrected.

The relations diagram edit module 165 is connected to the related information extraction module 155, the display module 160, and the deployment table generation module 115 of the relations diagram and deployment table creation module 105. The relations diagram edit module 165 edits a relations diagram displayed by the display module 160 in accordance with an editing operation performed by the user on the relations diagram. For example, the relations diagram edit module 165 edits, in accordance with an editing operation performed by the user, attribute information regarding arrows for which the display module 160 has displayed a message indicating that there is an inconsistency. The relations diagram edit module 165 also edits, in accordance with editing operations performed by the user, items (includes addition and deletion), attributes of the items, arrows (includes addition and deletion), attributes of the arrows, and the like.

The relations diagram edit module 165 may also correct a relations diagram corresponding to a deployment table corrected by the deployment table operation reception module 150. If the user performs an operation for editing a displayed deployment table, for example, the relations diagram edit module 165 edits the deployment table on the basis of the operation and causes a relations diagram corresponding to the deployment table to reflect a result of the editing. As a result, information regarding the relations diagram and the deployment table remains the same even when the user does not use the relations diagram. Details of the process will be described later with reference to FIGS. 21A to 27.

Figure 2:
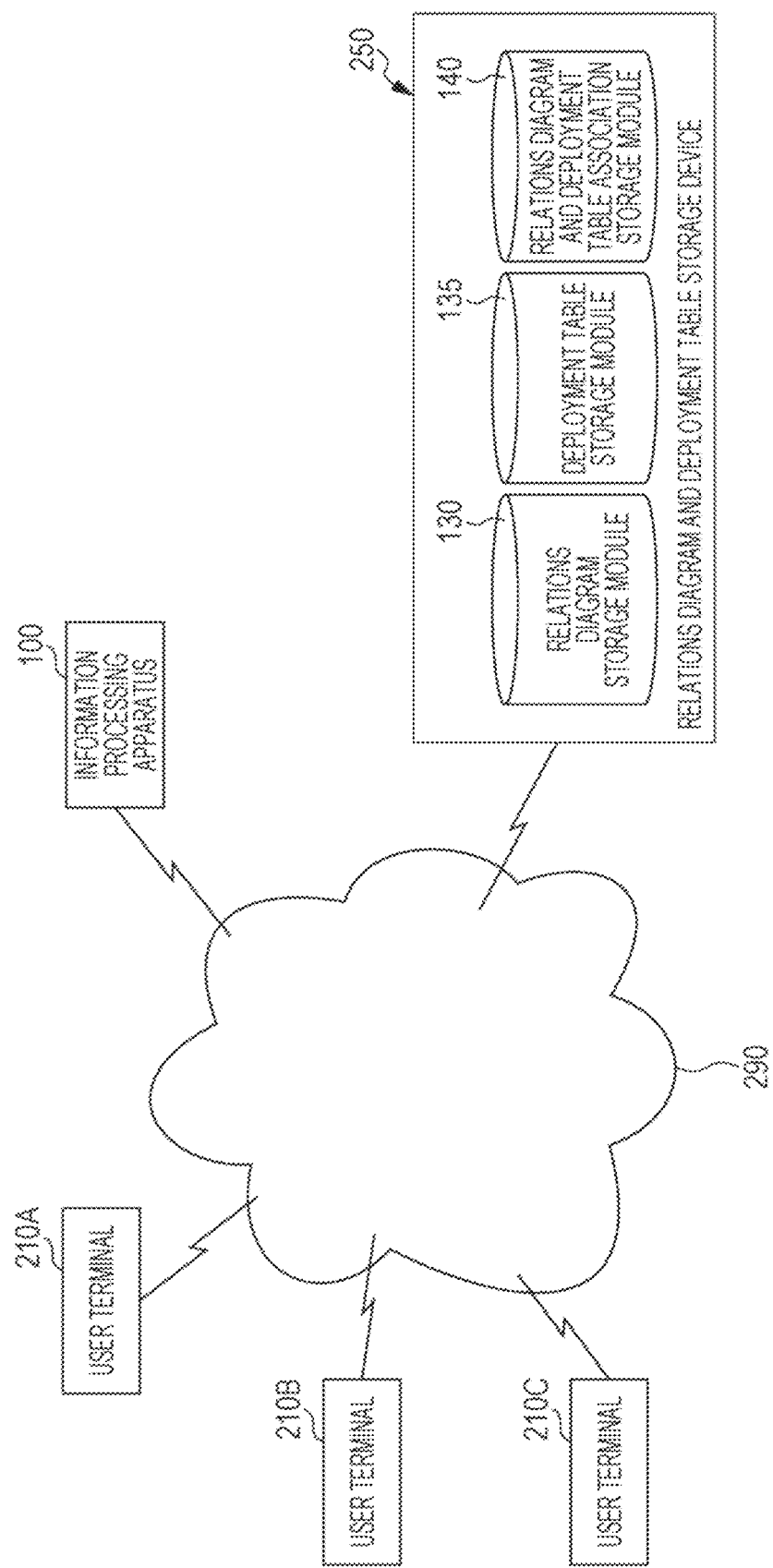
FIG. 2 is a diagram illustrating an example of a system configuration according to the exemplary embodiment.

FIG. 2 is a diagram illustrating an example of a system configuration according to the present exemplary embodiment.

An information processing apparatus 100, a user terminal 210A, a user terminal 210B, a user terminal 210C, and a relations diagram and deployment table storage device 250 are connected to one another through a communication line 290. The communication line 290 may be a wireless or wired line or a combination of wireless and wired lines, and may be, for example, the Internet or an intranet as a communication infrastructure. Functions of the information processing apparatus 100 and the relations diagram and deployment table storage device 250 may be achieved as a cloud service. The relations diagram and deployment table storage device 250 includes the relations diagram storage module 130, the deployment table storage module 135, and the relations diagram and deployment table association storage module 140. The information processing apparatus 100 may use the relations diagram storage module 130, the deployment table storage module 135, and the relations diagram and deployment table association storage module 140 included in the relations diagram and deployment table storage device 250 through the communication line 290 as the relations diagram storage module 130, the deployment table storage module 135, and the relations diagram and deployment table association storage module 140.

The information processing apparatus 100 creates a relations diagram in accordance with an operation performed by a user using the user terminal 210A, for example, and a deployment table is generated on the basis of the relations diagram. The technique disclosed in Japanese Unexamined Patent Application Publication No. 2016-081185, for example, may be used. Relations diagram information is stored in the relations diagram storage module 130 of the relations diagram and deployment table storage device 250 through the communication line 290, and deployment table information is stored in the deployment table storage module 135 of the relations diagram and deployment table storage device 250 through the communication line 290.

A user of the user terminal 210B mainly uses a deployment table, for example, and edits the deployment table. After the deployment table is edited, the information processing apparatus 100 displays a relations diagram associated with the deployment table and emphasizes items or arrows of the relations diagram associated with an axis item or cause-and-effect information that is an editing target. The user then checks and, as necessary, edits the relations diagram.

The user terminals 210 may include the information processing apparatus 100. In this case, a standalone system is established.

Figure 3:
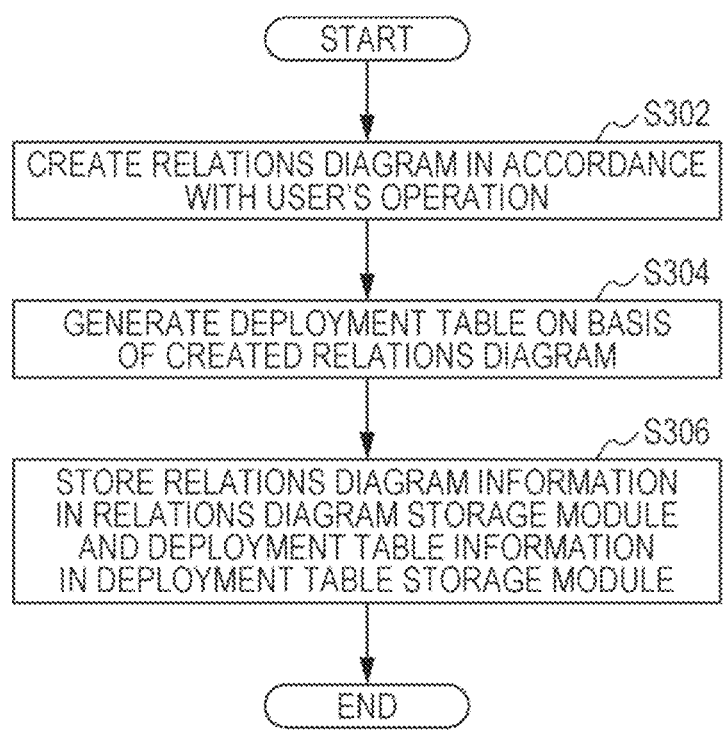
FIG. 3 is a flowchart illustrating an example of a process according to the exemplary embodiment.

FIG. 3 is a flowchart illustrating an example of a process according to the present exemplary embodiment (relations diagram and deployment table creation module 105).

In step S302, the relations diagram creation module 110 creates a relations diagram in accordance with an operation performed by the user.

In step S304, the deployment table generation module 115 generates a deployment table on the basis of the created relations diagram.

In step S306, the output module 120 stores relations diagram information in the relations diagram storage module 130 and deployment table information in the deployment table storage module 135.

Next, an example will be described with reference to FIGS. 4 to 8 in which a relations diagram is created for a mechanism of a straw whistle and a deployment table is generated.

Figure 4:
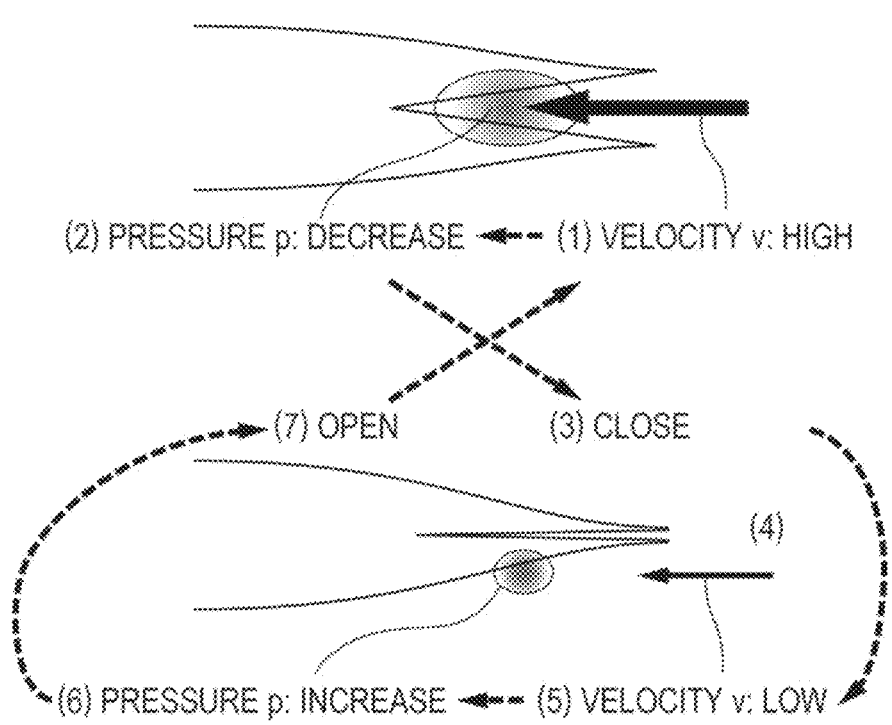
FIG. 4 is a diagram illustrating an example of a technique for which a relations diagram and a deployment table are created.

FIG. 4 is a diagram illustrating an example of a technique (the mechanism of the straw whistle) for which a relations diagram and a deployment table are created.

A principle in fluid dynamics stating that an increase in the speed of a fluid occurs simultaneously with a decrease in pressure, which is Bernoulli's principle (refer to expression (1)), is used for the straw whistle.

$$p + \tfrac{1}{2}\rho v^2 = \text{constant} \quad (p: \text{pressure}, r: \text{density}, v: \text{velocity}) \qquad (1)$$

Vibration of the straw whistle can be explained as follows. Numbers below correspond to numbers indicated in FIG. 4.

(1) A person blows the straw and flow velocity inside the straw increases
(2) Pressure decreases
(3) Reed closes
(4) Passage narrows
(5) Flow velocity decreases
(6) Pressure increases
(7) Reed opens and the process returns to (1)

FIG. 5 is a diagram illustrating an example of a relations diagram. FIG. 5 illustrates an example of a relations diagram of a mechanism of a straw whistle that does not emit sound. The relations diagram creation module 110 creates the relations diagram in accordance with an operation performed by the user.

It is assumed here that the density of air does not vary and a way of pinching the straw is not determined.

In the example illustrated in FIG. 5, items defined by rectangles are connected to each other by arrows. Upward arrows inside the item indicate that there are upward changes in the items and downward arrows indicate that there are downward changes in the items.

Colors of the arrows connecting the items to each other indicate the polarity of cause-and-effect relationships.

Thick black arrows connecting the items to each other indicate that there are positive correlations, and double lines (white lines) connecting the items to each other indicate that there are negative correlations. If an item "vibration" decreases, for example, an item "sound output" also decreases. Alternatively, levels of effects of cause-and-effect relationships may be indicated by solid lines and broken lines. These pieces of information are stored in the attribute field 1120 of the arrow information table 1100.

Figure 6:
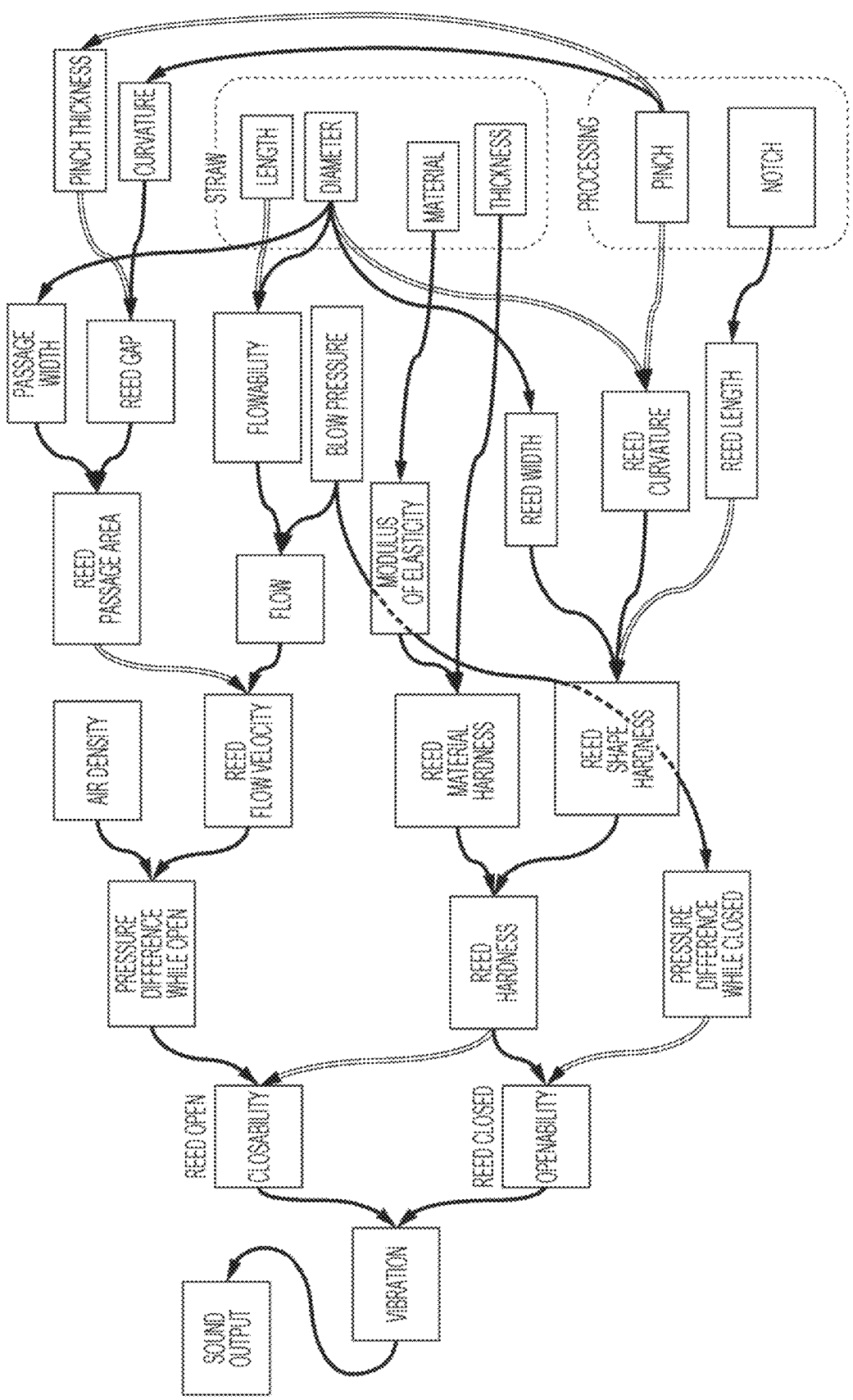
FIG. 6 is a diagram illustrating another example of the relations diagram.

FIG. 6 is a diagram illustrating another example of the relations diagram. The relations diagram illustrated in FIG. 6 is obtained by changing all the items of the relations diagram illustrated in FIG. 5 to upward factors. That is, FIG. 6 illustrates an example of a relations diagram of sound stability. As a result, some positive correlations change to negative correlations and some negative correlations change to positive correlations among the arrows connecting the items to each other.

Figure 7:
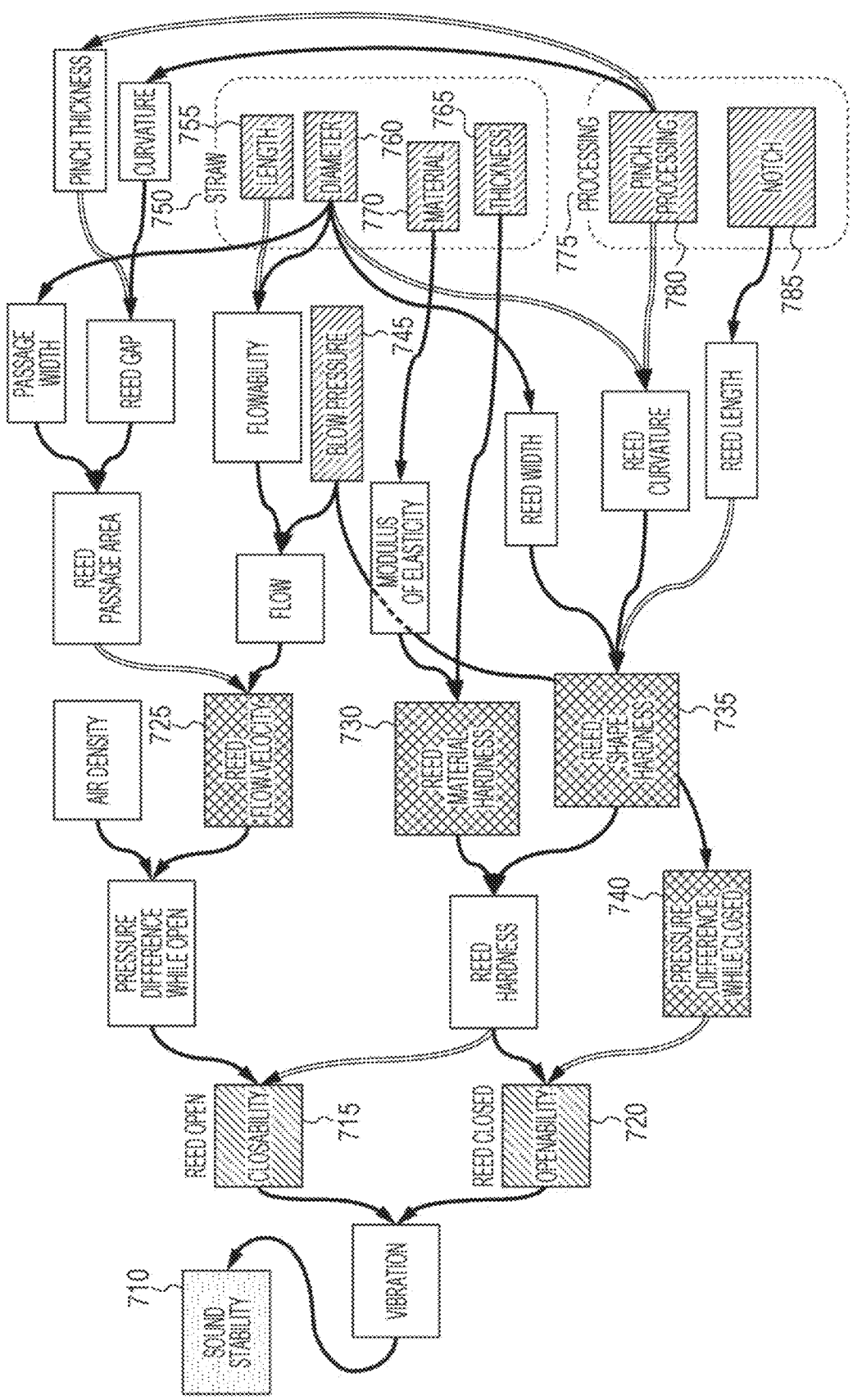
FIG. 7 is a diagram illustrating another example of the relations diagram.

FIG. 7 is a diagram illustrating another example of the relations diagram.

FIG. 7 illustrates an example in which items to be used as axes (axis items) of a deployment table have been selected through an operation performed by the user. Here, a first axis is quality (guaranteed for a customer), a second axis is performance (an indicator of the operation of each component of a system), a third axis is a control physical quantity (a physical quantity to be controlled), and a fourth axis is setting items (items determined by a designer).

An item (sound stability) 710 has been selected as the first axis.

An item (closability) 715 and an item (openability) 720 have been selected as the second axis.

An item (reed flow velocity) 725, an item (reed material hardness) 730, an item (reed shape hardness) 735, and an item (pressure difference while open) 740 have been selected as the third axis.

An item (blow pressure) 745, an item (length) 755, an item (diameter) 760, an item (thickness) 765, an item (material) 770, an item (pinch) 780, and an item (notch) 785 have been selected as the fourth axis.

Figure 8:
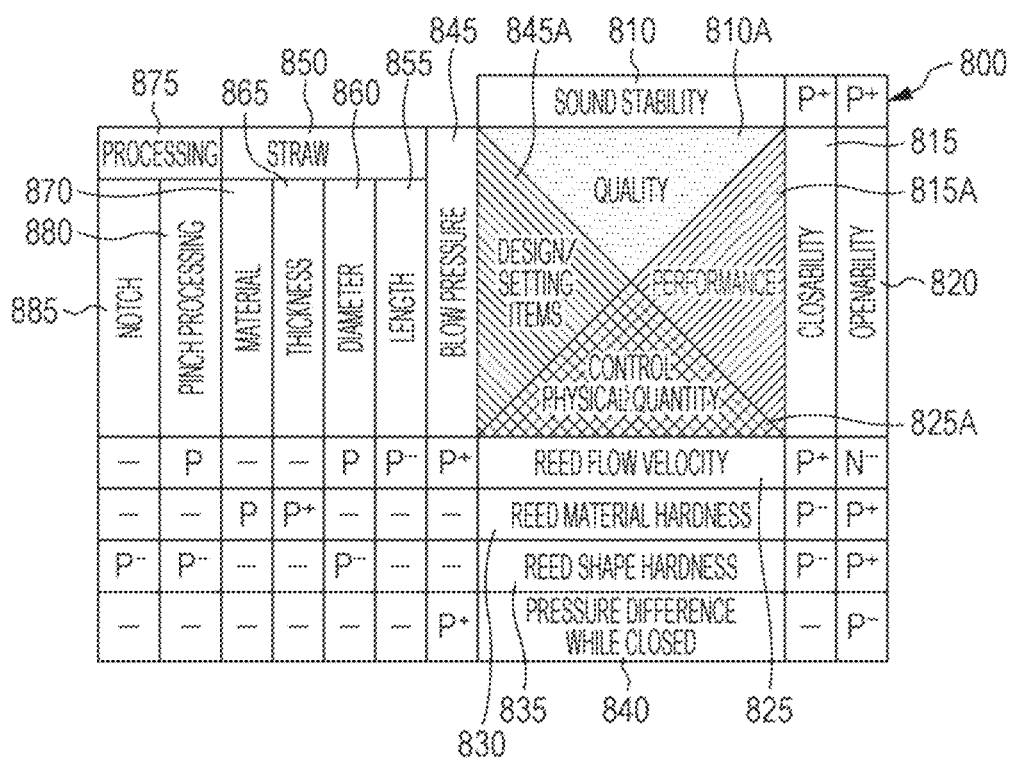
FIG. 8 is a diagram illustrating an example of a deployment table.

FIG. 8 is a diagram illustrating an example of a deployment table. FIG. 8 illustrates a deployment table generated from the relations diagram illustrated in FIG. 7. That is, FIG. 8 illustrates an example of a deployment table of the sound stability of the straw whistle.

A target of a deployment table is the entirety or a part of a system developed or designed to satisfy properties required by a customer (a next step may be included).

The first axis (quality) 810A is a quality (an indicator of a value for a customer), that is, an evaluation indicator of a value (satisfaction level) offered to a customer (next step). The first axis (quality) 810 is an indicator of a value obtained when a system (component) that is a target of a deployment table achieves a function thereof and an evaluation indicator of a value (satisfaction level) offered to a customer (next step) by the system or a higher system. The first axis (quality) 810A includes the axis item (sound stability) 810.

A second axis (performance) 815A is performance (an indicator of a degree of manifestation of a function), that is, an indicator of a degree of manifestation of a unique role (function) achieved by a component or a subsystem of a system in order to produce a quality. The second axis (performance) 815A is also an indicator of a degree of accompanying performance (properties to be achieved) while assuming interactions between subsystems and the entirety of the system as subsystems in a broad sense and including roles (actions) for undesirable phenomena. The second axis (performance) 815A may include noise that does not directly affect performance but that affects a quality. The second axis (performance) 815A includes an axis item (closability) 815 and an axis item (openability) 820.

A third axis (control physical quality) 825A is a control physical quantity (a physical quantity to be controlled), that is, a physical quantity to be controlled or specified in order for a component or a subsystem to achieve performance. Although all the items might not be actually controlled or measured, development or designing should usually be performed in accordance with the physical quantity. If design items are control physical quantities, the same items may be described for the third and fourth axes. The third axis (control physical quantity) 825A includes an axis item (reed fluid velocity) 825, an axis item (reed material hardness) 830, an axis item (reed material shape hardness) 835, and an axis item (pressure difference while closed) 840.

A fourth axis (design/setting items) 845A is setting items (quantities and conditions directly determined by a designer), that is, setting conditions for controlling the control physical quantity of a target component or subsystem and quantities and conditions that can be determined (to be determined) by the designer. The fourth axis (design/setting items) 845A may include noise that affects the control physical quantity. The fourth axis (design/setting items) 845A includes an axis item (blow pressure) 845, an axis item (straw) 850, and an axis item (processing) 875. The axis item (straw) 850 includes an axis item (length) 855, an axis item (diameter) 860, an axis item (thickness) 865, and an axis item (material) 870. The axis item (processing) 875 includes an axis item (pinch) 880 and an axis item (notch) 885.

Cells (rectangles in which P or the like is written in the example illustrated in FIG. 8) whose positions are determined in adjacent axis items of a deployment table are cause-and-effect information. The cause-and-effect information indicates a cause-and-effect relationship between two axis items. Signs "P" and "N" indicate the polarity of cause-and-effect relationships, and accompanying signs "+" and "−" indicate a degree of effect of the cause-and-effect relationships. That is, "P" indicates a positive correlation, "N" indicates a negative correlation, "P$^+$" indicates a strong positive correlation, "P$^+$" indicates a week positive correlation, "N$^+$" indicates a strong negative correlation, "N$^-$" indicates a week negative correlation, and "−" indicates no correlation. A relationship between the axis item (sound stability) 810 and the axis item (closability) 815, for example, is "P+". These pieces of information are stored in the attribute field 1420 of the cause-and-effect information table 1400. Since the arrow information table 1100 of a relations diagram and the cause-and-effect information table 1400 of a deployment table correspond to each other in the arrow ID and cause-and-effect information association table 1700, these pieces of information correspond to each other.

Since the item information table 1000 of a relations diagram and the axis item information table 1300 of a deployment table correspond to each other in the item ID and axis item ID association table 1600, these pieces of information correspond to each other.

Although a deployment table is generated from a relations diagram, the relations diagram includes, as described in the example of the straw whistle, explanatory items for facilitating thinking because the relations diagram is used to clarify relationships between complex factors in the form of a diagram illustrating cause-and-effect and purpose-and-measure relationships. The deployment table, on the other hand, is used to express cause-and-effect relationships between items defined by a function or performance of each step and does not include explanatory items. When a deployment table is generated from a relations diagram, therefore, only relevant items are extracted, and the extracted items are assigned to appropriate axis items of the deployment table (refer to Japanese Unexamined Patent Application Publication No. 2016-081185).

The number of relations diagram from which a deployment table is generated is not necessarily one, and a deployment table can include plural cause-and-effect relationships. In this case, there are plural relations diagram for the deployment table.

In addition, when a relations diagram is converted into a deployment table, the deployment table is generated using part of data included in the relations diagram. Even if a deployment table is generated from a single relations diagram, therefore, irreversible conversion is performed. For this reason, there are two kinds of data for the same technique, namely the relations diagram and the deployment table, but these two kinds of data need to be consistent with each other in consideration of accumulation of technical resources.

In the present exemplary embodiment, therefore, the consistency between a relations diagram and deployment table is maintained by associating data.

In the present exemplary embodiment, the following processes are performed.

(1) Addition, deletion, and correction of factors in a deployment table converted from a relations diagram and addition, deletion, and correction of cause-and-effect relationships When an item or a cause-and-effect relationship between items is edited in a deployment table, a relations diagram from which the deployment table has been generated is read and displayed on the basis of relations diagram information stored as attribute information accompanying the item or the cause-and-effect relationship between the items. The user is then prompted to edit the relations diagram. A result of the editing is reflected by the deployment table and displayed. Since original data is only the relations diagram, the consistency between the deployment table and the relations diagram is maintained.

In the case of a deployment table without a relations diagram, the deployment table may be directly edited or a relations diagram generated in a simpler manner may be edited. In either way, the consistency is maintained.

(2) A relations diagram including the editing target (item) or the cause-and-effect relationship between the items is displayed, and the editing target or the cause-and-effect relationship between the items is emphasized (e.g., highlighted).

(3) If there are plural applicable relations diagrams, all the relations diagrams are displayed. This is because the plural relations diagrams might include the same item or the cause-and-effect relationship.

(4) Although the item or the cause-and-effect relationship between the items is associated with information regarding a relations diagram to which the item or the cause-and-effect relationship between the items belongs in order to call the relations diagram, the number of relations diagrams read is not limited to one.

In addition, when plural axis items have been selected, the plural axis items may be edited as the same axis item. For example, the items are merged with each other.

Alternatively, an item and a cause-and-effect relationship relating to the item may be merged with each other.

If inconsistency occurs due to mergence, the user may be notified of the inconsistency and prompted to perform editing (correction).

Figure 18:
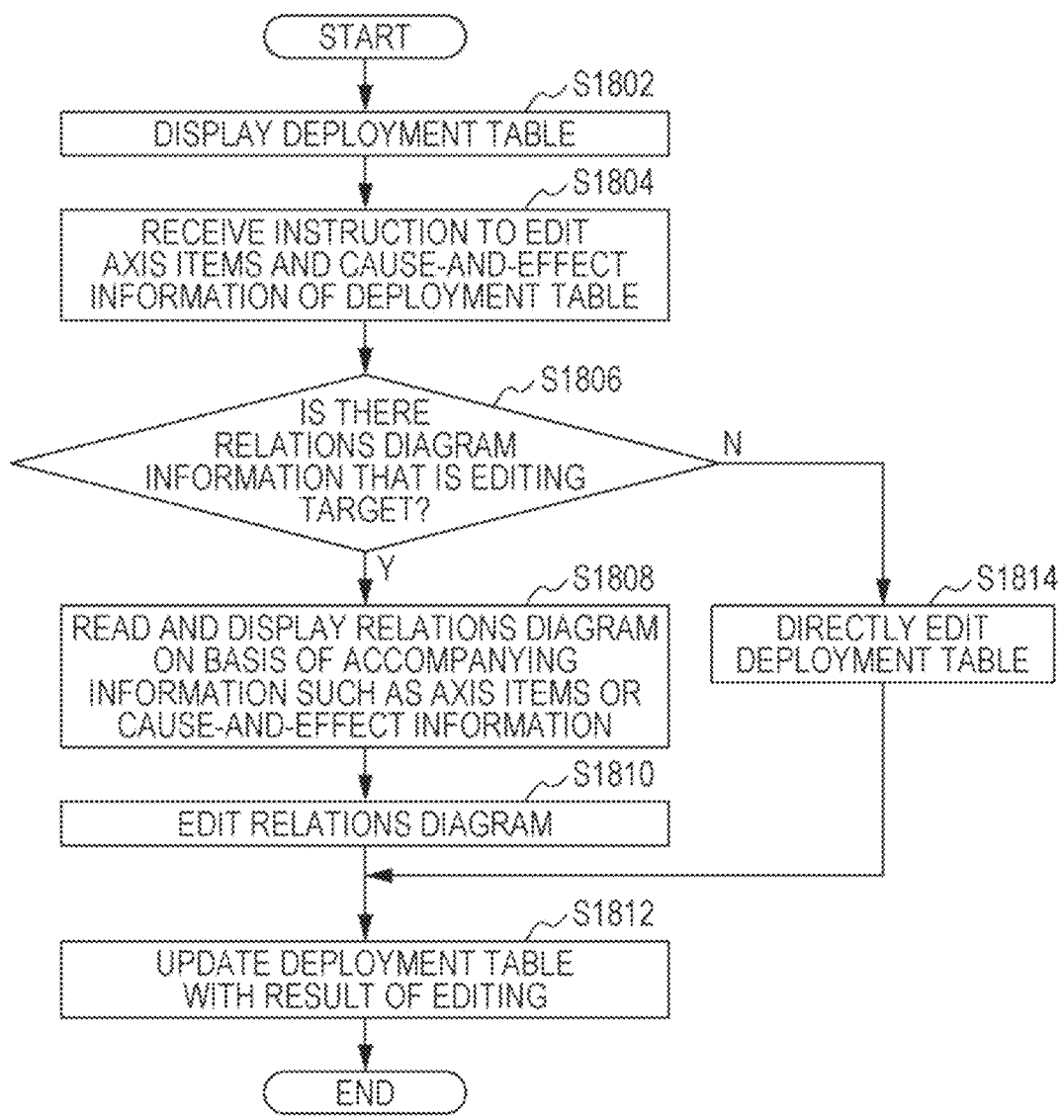
FIG. 18 is a flowchart illustrating an example of a process according to the exemplary embodiment.

FIG. 18 is a flowchart illustrating an example of a process according to the present exemplary embodiment.

In step S1802, the display module 160 displays a deployment table in accordance with a display operation performed by the user.

In step S1804, the deployment table operation reception module 150 receives an editing instruction issued by the user to an axis item or cause-and-effect information of the deployment table.

In step S1806, the related information extraction module 155 determines whether there is relations diagram information that is an editing target, and if so, the process proceeds to step S1808. If not, the process proceeds to step S1814. That is, whether there is a relations diagram (a relations diagram from which the deployment table has been generated) corresponding to the deployment table is determined.

In step S1808, the display module 160 reads and displays the relations diagram on the basis of information accompanying the axis item or the cause-and-effect information.

In step S1810, the relations diagram edit module 165 edits the relations diagram in accordance with an operation performed by the user.

In step S1812, the deployment table generation module 115 causes the deployment table to reflect a result of the editing.

In step S1814, the deployment table operation reception module 150 directly edits the deployment table in accordance with an operation performed by the user.

Figure 19:
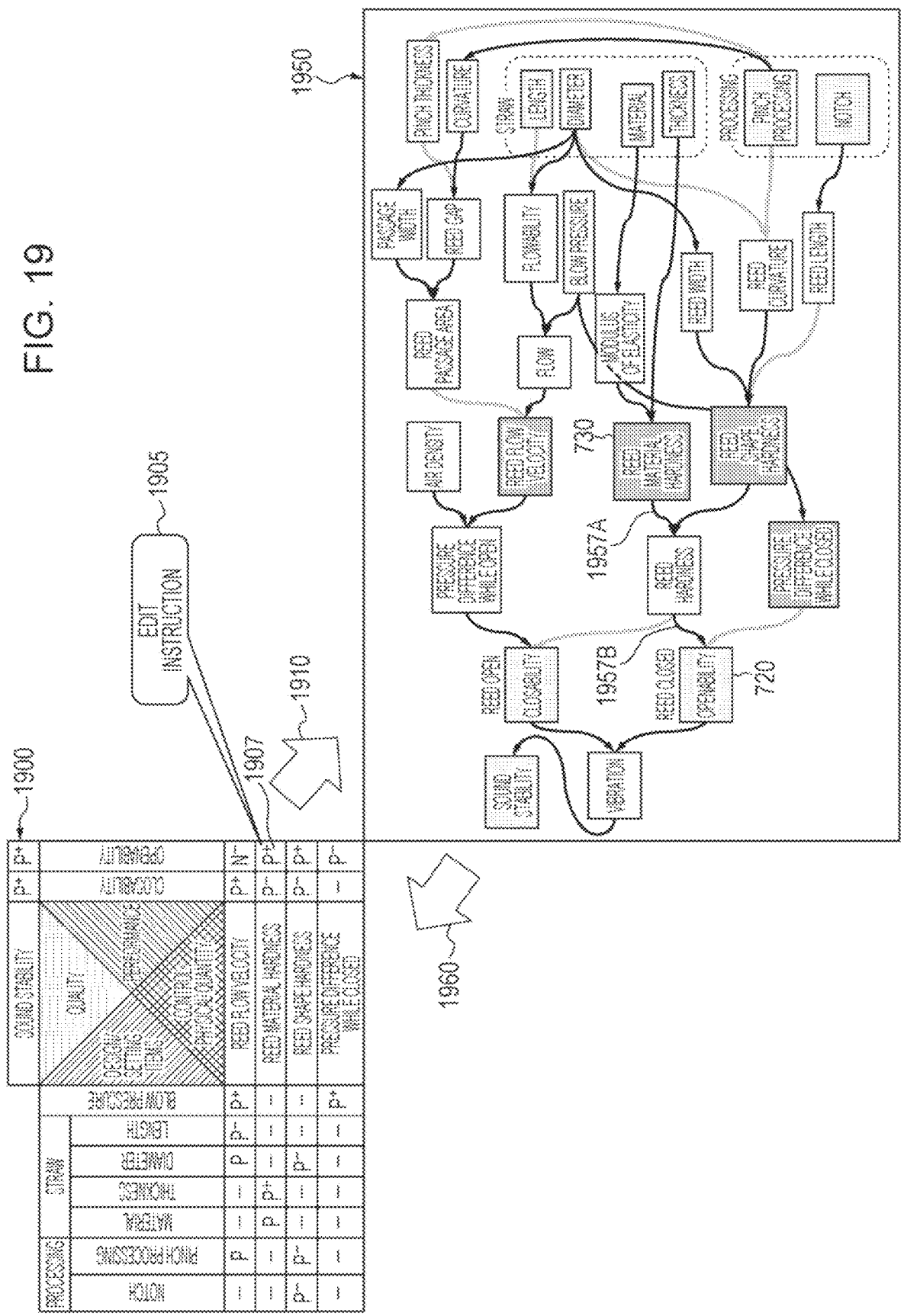
FIG. 19 is a diagram illustrating an example of a process according to the exemplary embodiment.

FIG. 19 is a diagram illustrating an example of a process according to the present exemplary embodiment.

An editing instruction 1905 is issued to a deployment table 1900 as a result of an operation performed by the user. The editing instruction 1905 need not be actual editing but may be a declaration of intent of editing. A relations diagram 1950 corresponding to the deployment table 1900 is displayed using the relations diagram ID and deployment table ID association table 1500.

The relations diagram 1950 is then edited as a result of an operation performed by the user, and the deployment table 1900 reflects a result of the editing.

Cause-and-effect information 1907 is located at an intersection between the axis item (openability) 820 and the axis item (reed material hardness) 830. The axis item (openability) 820 corresponds to the item (openability) 720, and the axis item (reed material hardness) 830 corresponds to the item (reed material hardness) 730. This association is managed by the item ID and axis item ID association table 1600. The cause-and-effect information 1907 corresponds to arrows 1957A and 1957B. This association is managed by the arrow ID and cause-and-effect information association table 1700.

Figure 20:
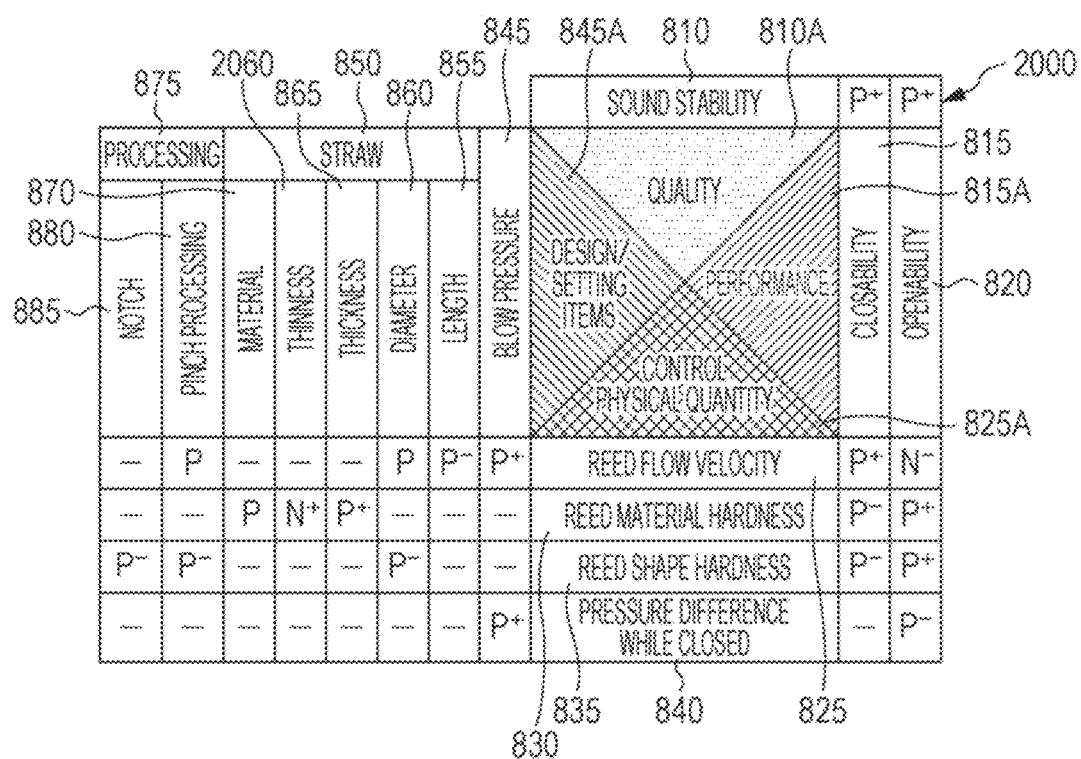
FIG. 20 is a diagram illustrating an example of a process according to the exemplary embodiment.

FIG. 20 is a diagram illustrating an example of a process according to the present exemplary embodiment.

If the user selects plural axis items (e.g., the axis item (closability) 815, the axis item (openability) 820, and the like) in a deployment table 2000, the plural axis items are edited as the same axis item (the axis items are merged with each other). Alternatively, an item and cause-and-effect information relating to the item may be merged with each other.

More specifically, the deployment table 2000 includes "thinness", which indicates the same concept as "thickness" (the axis item (thickness) 865 and an axis item (thinness) 2060). If the axis item (thickness) 865 and the axis item (thinness) 2060 are selected, relations diagrams corresponding to these axis items are read, and either of the following processes is performed.

(1) Either of the two (e.g., the relations diagram) is edited, and the other (e.g., the deployment table) reflects a result of the editing.

(2) The items (or the axis items) are merged with each other as the same concept.

If inconsistency is caused in a cause-and-effect relationship as a result of the mergence (i.e., after the items are handled as the same item), the user is notified that it is difficult to handle the items as the same item because of the inconsistency, and prompted to perform correction. Although the axis item (thickness) 865 and the axis item (reed material hardness) 830 have a positive correlation in a relations diagram corresponding to the deployment table 2000, for example, the axis item (thinness) 2060 and the axis item (reed material hardness) 830 have a negative correlation, which causes inconsistency. Inconsistency may be identified from a single deployment table, or may be found between plural deployment tables. The latter applies when an axis item (thickness) and an axis item (reed material hardness) have a positive correlation in a deployment table but an axis item (thinness) and the axis item (reed material hardness) have a negative correlation in another deployment table when the axis item (thickness) and the axis item (thinness) are to be merged with each other. Needless to say, the two deployment tables correspond to one relations diagram (i.e., the two deployment table have been generated from the relations diagram).

In the above description, when an instruction to correct a deployment table (an instruction that does not necessarily indicate actual correction) is issued, a relations diagram corresponding to the deployment table is displayed, and the user is prompted to perform editing.

Some users, however, use only deployment tables and do not use relations diagram. It is unnecessary to request such users to edit a relations diagram (i.e., this put burdens on the users). The present exemplary embodiment, including editing, applies to both a user who generates deployment tables from relations diagrams and a user who uses only deployment tables.

That is, in the present exemplary embodiment, when a user who mainly uses deployment tables and a user who mainly uses relations diagram edit deployment tables for the same technique, for example, the user who mainly uses deployment tables is not prompted to edit a relations diagram, and consistency is maintained.

A case will be described with reference to FIGS. 21A to 27 in which a deployment table is actually corrected and a relations diagram reflects a result of the correction.

Figure 21A:
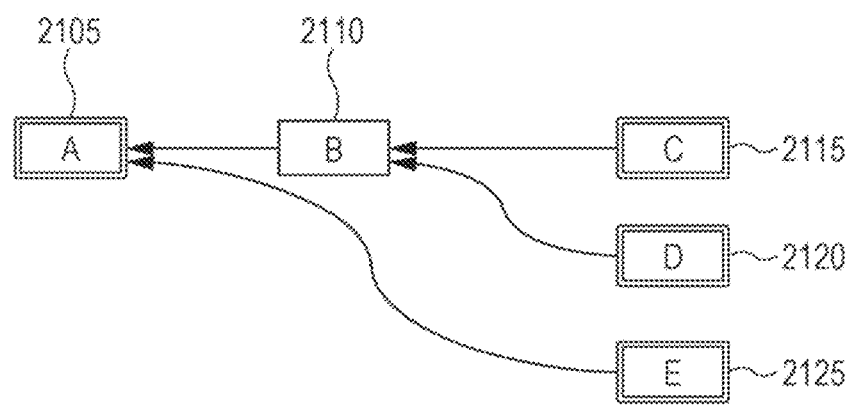
FIGS. 21A and 21B are diagrams illustrating examples of a process according to the exemplary embodiment.
Figure 21B:
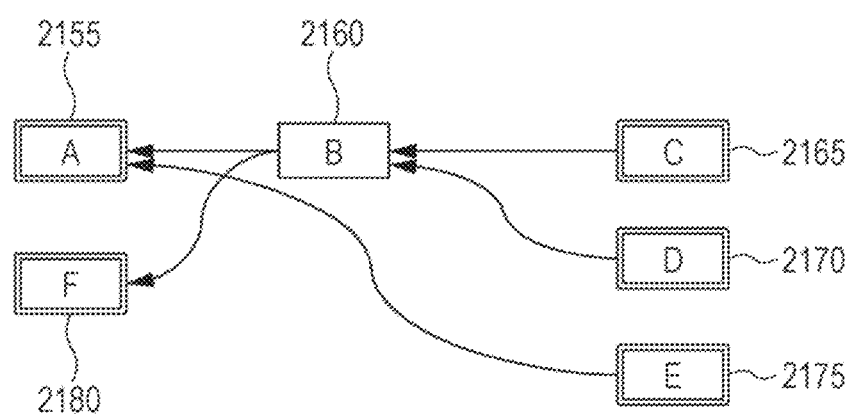

FIGS. 21A and 21B are diagrams illustrating examples of a process according to the present exemplary embodiment.

A method for causing a relations diagram to reflect a result of correction performed on a deployment table is as follows. An edited part may clearly indicate a fact of the editing, and a history of the editing may be recorded.

Figure 22:
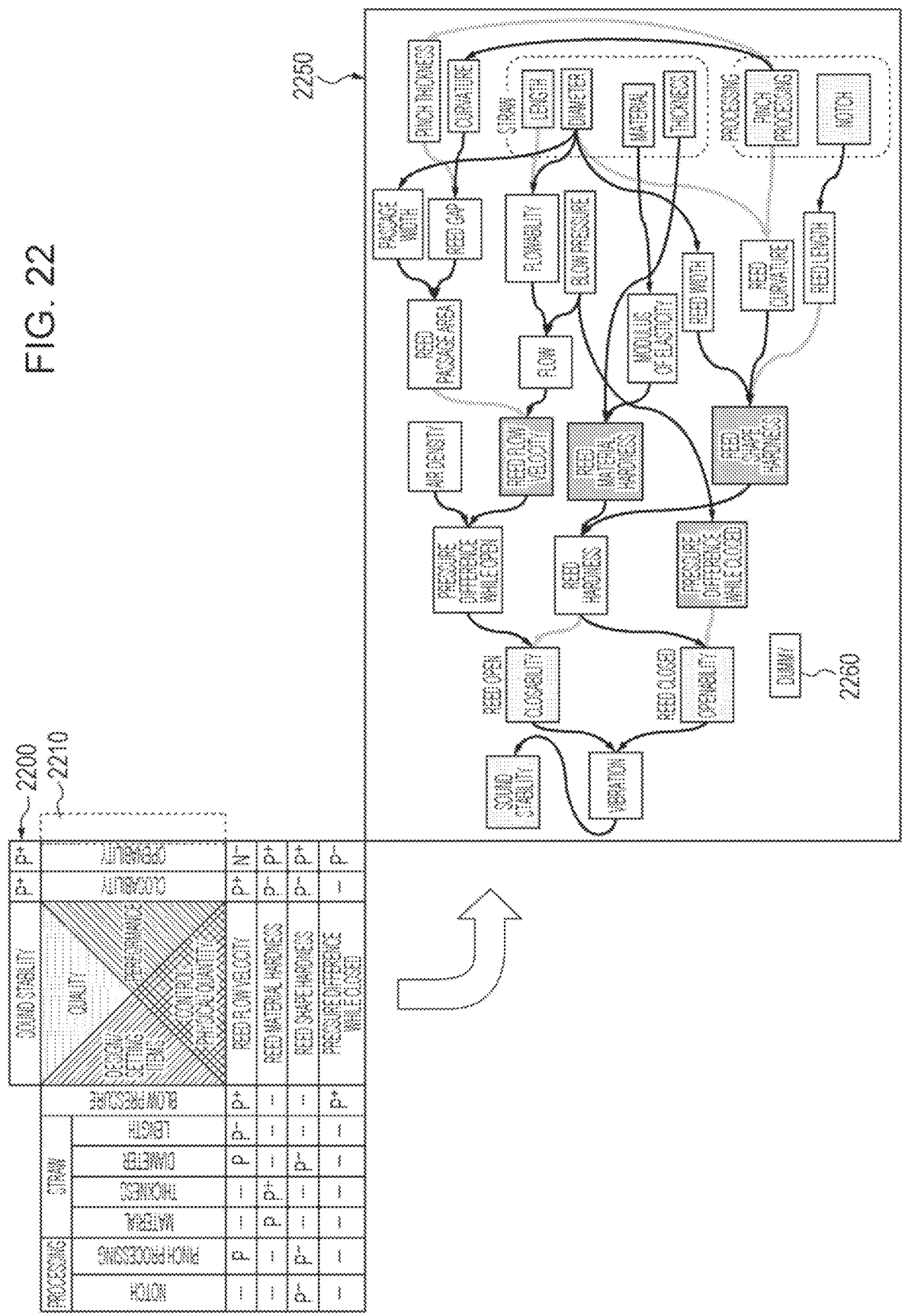
FIG. 22 is a diagram illustrating an example of a process according to the exemplary embodiment.

(A1) Addition of an axis item (factor) to a deployment table (refer to an example illustrated in FIG. 22)

Figure 23:
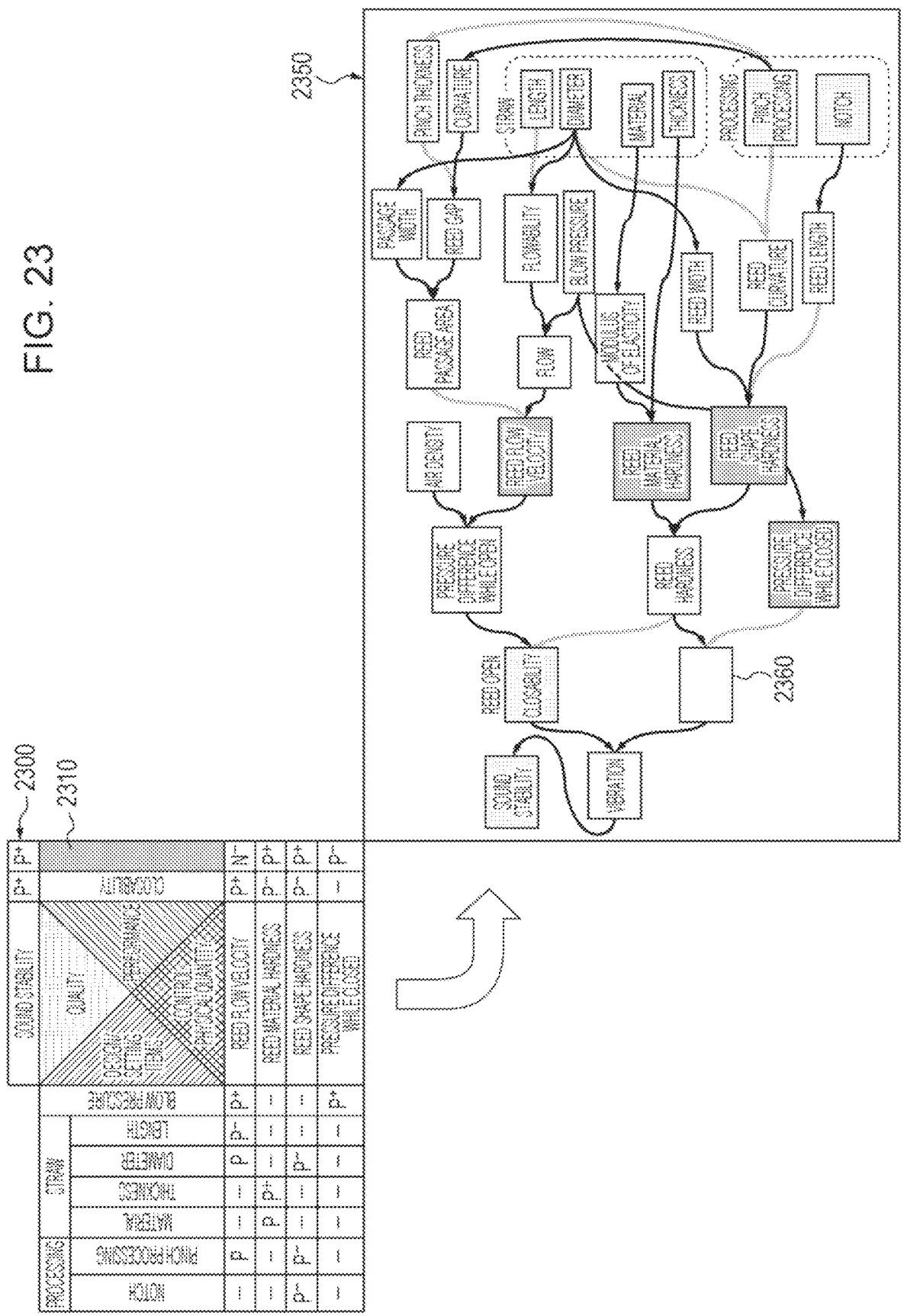
FIG. 23 is a diagram illustrating an example of a process according to the exemplary embodiment.

A dummy item (factor) is added to a part of a relations diagram to which an axis item (factor) is to be added (A2) Deletion of an axis item (factor) from a deployment table (refer to an example illustrated in FIG. 23)

A dummy item (factor) is left in a part of a relations diagram from which an axis item (factor) has been deleted.

Figure 24:
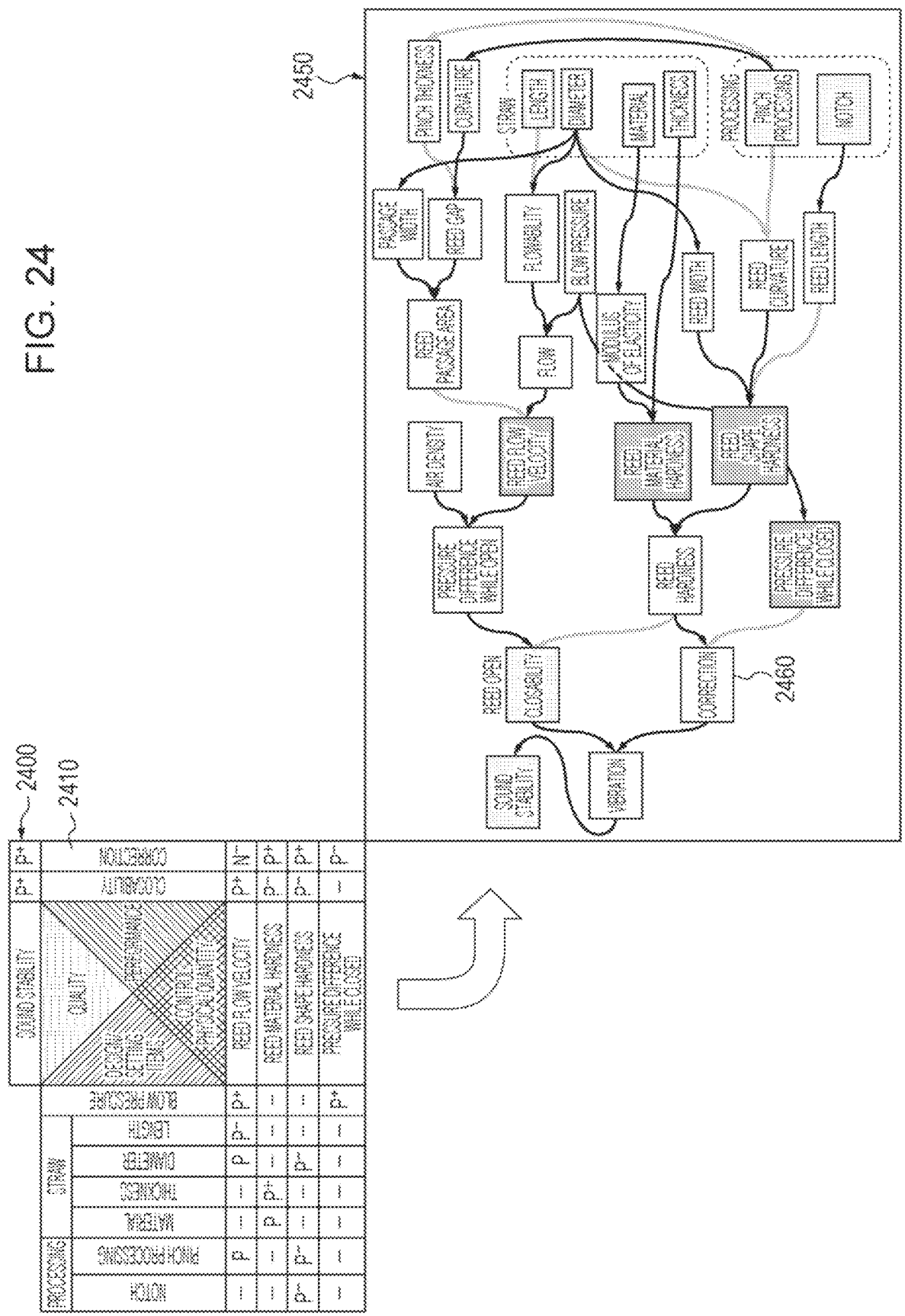
FIG. 24 is a diagram illustrating an example of a process according to the exemplary embodiment.

(A3) Correction of an axis item (factor) of a deployment table (refer to an example illustrated in FIG. 24)

A part of a relations diagram in which an axis item (factor) has been corrected reflects the correction.

Figure 25:
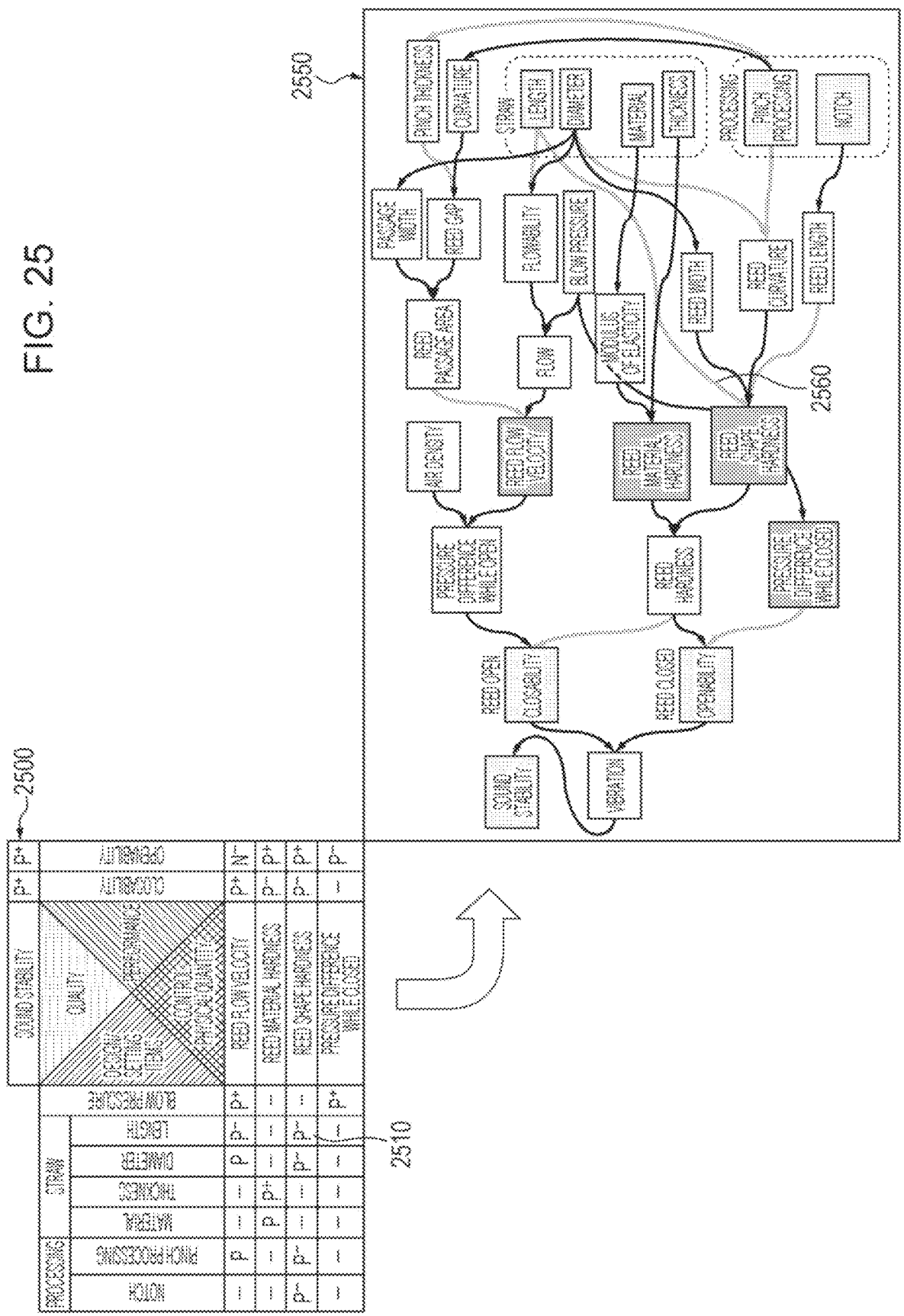
FIG. 25 is a diagram illustrating an example of a process according to the exemplary embodiment.

(B1) Addition of cause-and-effect information to a deployment table (refer to an example illustrated in FIG. 25)

A part of a relations diagram corresponding to cause-and-effect information between axis items is added.

Figure 26:
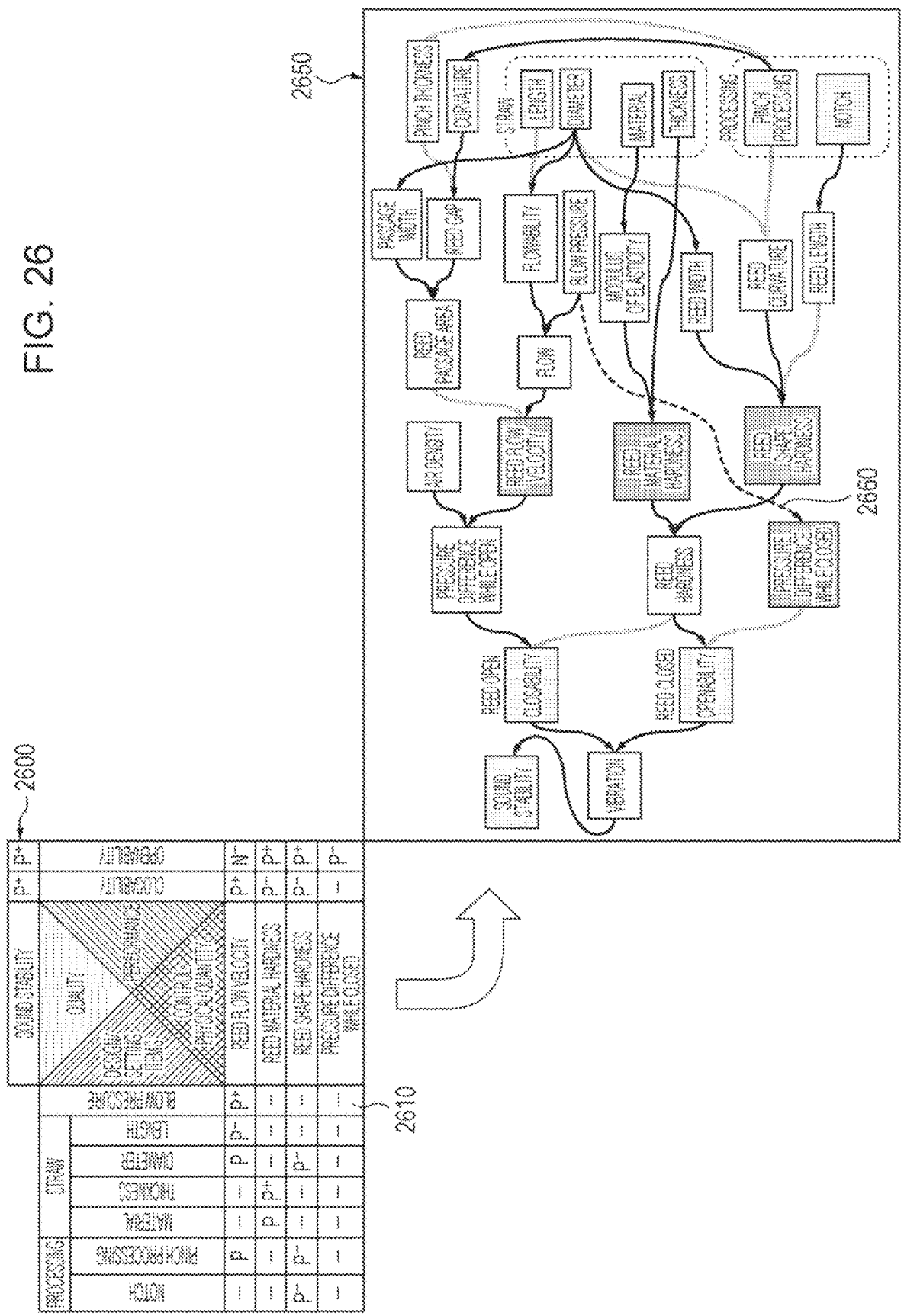
FIG. 26 is a diagram illustrating an example of a process according to the exemplary embodiment.

(B2) Deletion of cause-and-effect information from a deployment table (refer to an example illustrated in FIG. 26)

A part of a relations diagram corresponding to cause-and-effect information between axis items is deleted.

Figure 27:
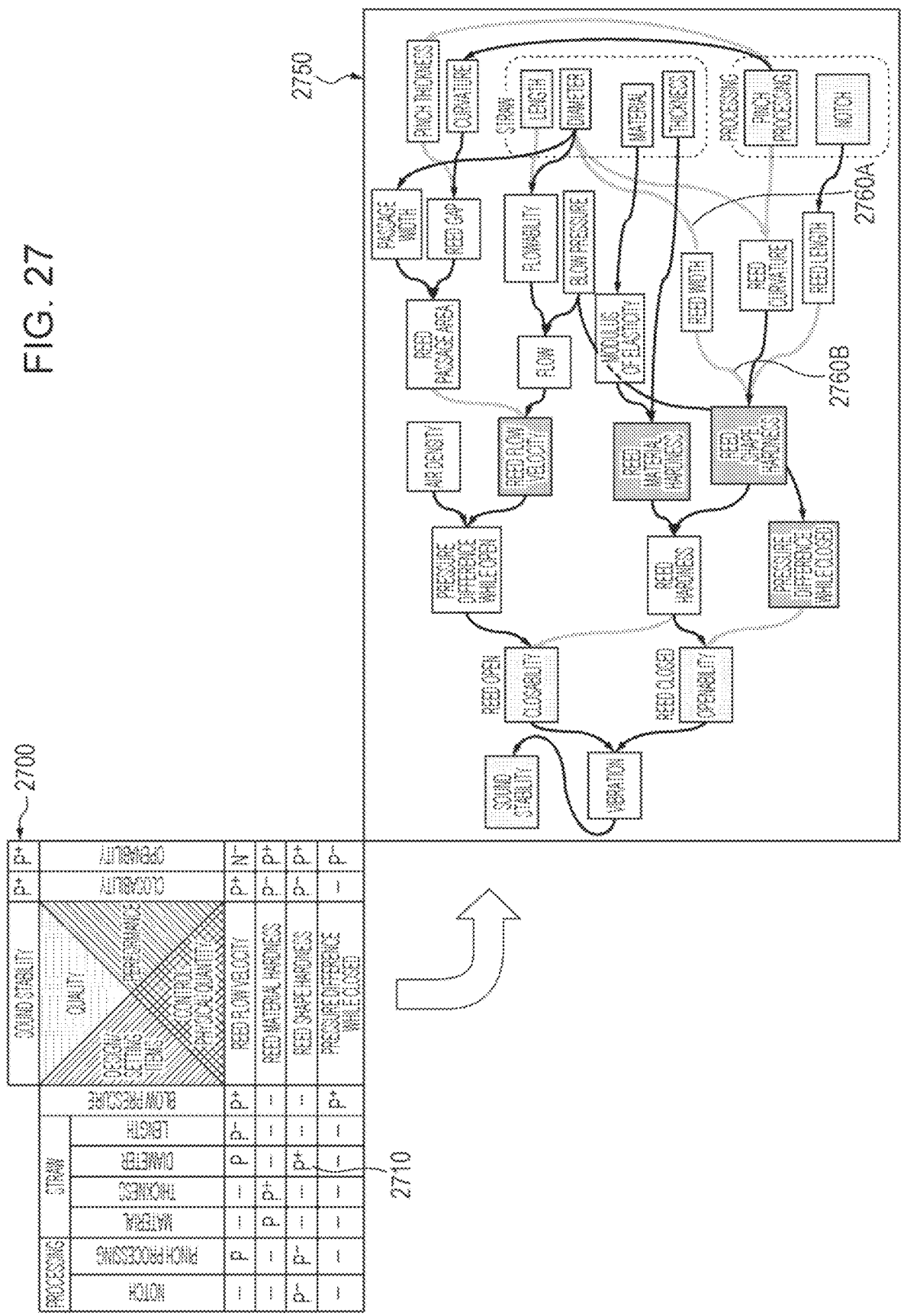
FIG. 27 is a diagram illustrating an example of a process according to the exemplary embodiment.

(B3) Correction of cause-and-effect information in a deployment table (refer to an example illustrated in FIG. 27)

A part of a relations diagram corresponding to cause-and-effect information between axis items is corrected.

Editing is performed without affecting already set cause-and-effect relationships, but other cause-and-effect relationships are affected in the case of deletion or correction. If a contradiction is caused, therefore, the user is notified of the contradiction, and editing is not performed. A contradiction is caused when there is a factor between axis items and the factor has a direct or indirect cause-and-effect relationship with another axis item. Whether a contradiction is caused may be determined by comparing an edited deployment table A and a deployment table B generated from a relations diagram created from the deployment table A.

In an example of a relations diagram illustrated in FIG. 21A, an item C 2115 is connected to an item B 2110, an item D 2120 is connected to the item B 2110, the item B 2110 is connected to an item A 2105, and an item E 2125 is connected to the item A 2105.

In an example of a relations diagram illustrated in FIG. 21A, an item C 2165 is connected to an item B 2160, an item D 2170 is connected to the item B 2160, the item B 2160 is connected to an item A 2155, the item B 2160 is connected to an item F 2180, and an item E 2175 is connected to the item A 2155.

It is assumed in FIG. 21A that, for example, the items A 2105, the item C 2115, the item D 2120, and the item E 2125 are set as axis items. Deletion or correction of a cause-and-effect relationship between the item A 2105 and the item E 2125 does not affect the other items. If a cause-and-effect relationship between the item A 2105 and the item B 2110 is deleted or corrected when a cause-and-effect relationship between the item A 2105 and the item D 2120 is deleted or corrected, however, a cause-and-effect relationship between the item A 2105 and the item C 2125 is affected. In this case, a cause-and-effect relationship between the item B 2110 and the item D 2120 is deleted or corrected.

If a cause-and-effect relationship between the item A 2155 and the item D 2170 is to be deleted in FIG. 21B, on the other hand, other cause-and-effect relationships are affected regardless of which cause-and-effect relationship is deleted or corrected. The user is therefore notified that it is difficult to perform deletion or correction. Alternatively, a relations diagram may be displayed to prompt the user to perform editing.

FIG. 22 is a diagram illustrating an example of a process (an example of addition of an axis item (factor) to a deployment table) according to the present exemplary embodiment.

A deployment table 2200 is obtained by adding a new axis item 2210 to a performance axis of the deployment table 1900.

In this case, as indicated by a relations diagram 2250, a new item (dummy) 2260 is added. The new item (dummy) 2260 is arranged close to an item of the relations diagram 2250 corresponding to other axis items (closability and openability) of the performance axis.

The relations diagram 2250 need not be displayed for a user who uses only the deployment table 2200. A determination whether the user uses only the deployment table 2200 may be made on the basis of a history (whether a relations diagram has been displayed) or an attribute of the user (an attribute indicating whether the user uses a relations diagram or the user's job).

FIG. 23 is a diagram illustrating an example of a process (an example of deletion of an axis item (factor) from a deployment table) according to the present exemplary embodiment.

A deployment table 2300 is obtained by deleting a target axis item 2310 from the performance axis of the deployment table 1900 illustrated in FIG. 19.

In this case, as indicated by a relations diagram 2350, the deleted axis item (factor) is left as a target item (dummy) 2360.

FIG. 24 is a diagram illustrating an example of a process (an example of correction of an axis item (factor) in a deployment table) according to the present exemplary embodiment.

A deployment table 2400 is obtained by correcting a target axis item (correction) 2410, which is an axis item (factor) of the performance axis of the deployment table 1900.

In this case, as indicated by a relations diagram 2450, a target item (correction) 2460 corresponding to the target axis item (correction) 2410 is corrected.

FIG. 25 is a diagram illustrating an example of a process (an example of addition of cause-and-effect information to a deployment table) according to the present exemplary embodiment.

A deployment table 2500 is obtained by changing (corresponds to addition of cause-and-effect information) cause-and-effect information at an intersection between "length" and "reed material hardness" in the deployment table 1900 from "–" to "P$^+$" (new cause-and-effect information 2510).

In this case, as indicated by a relations diagram 2550, an arrow 2560 is added. The arrow 2560 connects the item "length" to the item "reed material hardness".

FIG. 26 is a diagram illustrating an example of a process (an example of deletion of cause-and-effect information from a deployment table) according to the present exemplary embodiment.

A deployment table 2600 is obtained by changing (corresponds to deletion of cause-and-effect information) cause-and-effect information at an intersection between "blow pressure" and "pressure difference while closed" in the deployment table 1900 from "P$^+$" to "–".

In this case, as indicated by a relations diagram 2650, a target arrow 2660 is deleted. If the deletion affects other cause-and-effect relationships, the user may be notified of the effect, and the arrow 2660 need not be deleted.

FIG. 27 is a diagram illustrating an example of a process (an example of correction of cause-and-effect information in a deployment table) according to the present exemplary embodiment.

A deployment table 2700 is obtained by changing (corresponds to correction of cause-and-effect information) cause-and-effect information at an intersection between "diameter" and "reed material hardness" in the deployment table 1900 from "P$^-$" to "P$^+$" (target cause-and-effect information 2710).

In this case, as indicated by a relations diagram 2750, target arrows 2760A and 2760B corresponding to the target cause-and-effect information 2710 are corrected. If the correction affects other cause-and-effect relationships, the user may be notified of the effect, and the arrows 2760A and 2760B need not be corrected.

Figure 28:
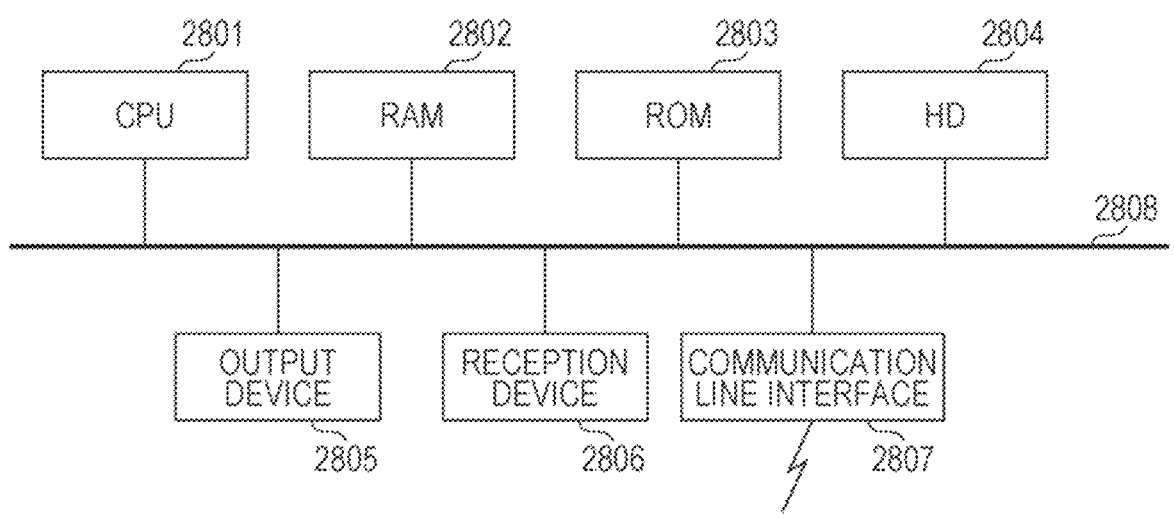
FIG. 28 is a block diagram illustrating an example of the hardware configuration of a computer that achieves the exemplary embodiment.

As illustrated in FIG. 28, the hardware configuration of a computer that executes a program according to the present exemplary embodiment is a common computer and, more specifically, a personal computer, a computer that can be a server, or the like. That is, in a specific example, a CPU 2801 is used as a processing unit (computing unit), and a random-access memory (RAM) 2802, a read-only memory (ROM) 2803, and a hard disk (HD) 2804 are used as storage devices. As the HD 2804, for example, a hard disk or a solid-state drive (SSD) may be used. The computer includes the CPU 2801 that executes programs such as the relations diagram and deployment table creation module 105, the relations diagram creation module 110, the deployment table generation module 115, the output module 120, the edit module 145, the deployment table operation reception module 150, the related information extraction module 155, the display module 160, and the relations diagram edit module 165, the RAM 2802 storing the programs and data, the ROM 2803 storing a program for activating the computer and the like, the HD 2804 that is an auxiliary storage device (may be a flash memory) having the functions of the relations diagram and deployment table storage module 125, the relations diagram storage module 130, the deployment table storage module 135, and the relations diagram and deployment table association storage module 140, a reception device 2806 that receives data on the basis of an operation performed by a user on a keyboard, a mouse, a touch screen, a microphone, a camera (includes a line-of-sight detection camera), or the like, an output device 2805 such as a cathode ray tube (CRT), a liquid crystal display, or a speaker, a communication line interface 2807 for connecting to a communication network, such as a network interface card, and a bus 2808 connecting these components to one another to communicate data. Plural computers may be connected to one another through a network.

The present exemplary embodiment can be achieved by causing a system having the above hardware configuration to read the computer program to operate software and hardware resources together.

The hardware configuration illustrated in FIG. 28 is an example, and the present exemplary embodiment is not limited to the configuration illustrated in FIG. 28. Any configuration capable of achieving the modules described in the present exemplary embodiment may be used. For example, some modules may be achieved by dedicated hardware (e.g., an application-specific integrated circuit (ASIC)), and some other modules may be provided in an external system and connected through a communication line. Furthermore, plural systems illustrated in FIG. 28 may be connected to one another through a communication line and operate together. The hardware configuration may be employed by a mobile information communication device (a mobile phone, a smartphone, a mobile device, a wearable computer, or the like), an information home appliance, a robot, a copying machine, a facsimile, a scanner, a printer, a multi-function device (an image processing device having at least two of functions of a scanner, a printer, a copying machine, a facsimile, and the like), or the like, instead of a personal computer.

The above-described program may be stored in a recording medium and provided or provided through a communication medium. In this case, for example, the program may be regarded as an invention of a computer readable recording medium storing the program.

The computer readable recording medium storing the program refers to a computer readable recording medium storing the program used to install, execute, and distribute the program.

The recording medium may be, for example, a digital versatile disc recordable (DVD-R), a DVD rewritable (DVD-RW) a DVD-RAM, or the like specified by a DVD forum, a DVD+R, a DVD+RW, or the like specified by DVD+RW, a compact disc ROM (CD-ROM), a CD recordable (CD-R), a CD rewritable (CD-RW), a Blu-ray disc (registered trademark), a magneto-optical (MO) disk, a flexible disk (FD), a magnetic tape, a hard disk, a ROM, an electrically erasable programmable read-only memory (EEPROM), a flash memory, a RAM, a secure digital (SD) memory card, or the like.

The entirety or a part of the program may be recorded in the recording medium and stored or distributed. As for communication, a wired or wireless network used for a local area network (LAN), a metropolitan area network (MAN), a wide area network (WAN), the Internet, an intranet, an extranet, or the like, or a combination thereof, for example, may be used to transmit the program. Alternatively, the program may be transmitted through carrier waves.

Furthermore, the program may be a part or the entirety of another program, or may be recorded in a recording medium along with another program. The program may be divided and recorded in plural recording media. The program may be compressed or encrypted. The program may be recorded in any manner insofar as the program can be restored.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
 a first association unit that associates a deployment table and a relations diagram with each other;
 a second association unit that associates an axis item, which is an item included in an axis of the deployment table, and an item in the relations diagram with each other;
 a third association unit that associates cause-and-effect information indicating a cause-and-effect relationship between two axis items of adjacent axes of the deployment table and an arrow connecting items to each other in the relations diagram with each other; and
 a display unit that displays, using at least one of the first to third association units, a relations diagram associated with a deployment table that is a correction target.

2. The information processing apparatus according to claim 1,
 wherein the display unit displays, using the first association unit, the relations diagram associated with the deployment table that is the correction target and, using the second association unit, an item associated with an axis item that is a correction target in a mode different from one for other items.

3. The information processing apparatus according to claim 2,
 wherein, if a plurality of axis items of an axis of the deployment table are integrated together, the display unit displays items in the relations diagram associated with the plurality of axis items while integrating the items together.

4. The information processing apparatus according to claim 3,
  wherein, if cause-and-effect information is different between the plurality of axis items integrated together and an axis item of an axis adjacent to the plurality of axis items, the display unit indicates that there is an inconsistency.

5. The information processing apparatus according to claim 1,
  wherein the display unit displays, using the first association unit, the relations diagram associated with the deployment table that is the correction target and, using the third association unit, an arrow associated with cause-and-effect information that is a correction target in a mode different from one for other arrows.

6. The information processing apparatus according to claim 5,
  wherein, if a plurality of axis items of an axis of the deployment table are integrated together, the display unit displays arrows in the relations diagram associated with cause-and-effect information regarding the plurality of axis items while integrating the arrows together.

7. The information processing apparatus according to claim 6,
  wherein, if attribute information is different between the plurality of arrows integrated together in the relations diagram, the display unit indicates that there is an inconsistency.

8. The information processing apparatus according to claim 1, further comprising:
  a generation unit that generates, if the relations diagram displayed by the display unit is corrected, a deployment table from the corrected relations diagram.

9. The information processing apparatus according to claim 8,
  wherein the display unit indicates that an item or an arrow displayed in a different mode is a correction target.

10. The information processing apparatus according to claim 9,
  wherein, if an item or an arrow other than the item or the arrow displayed in the different mode is selected as a correction target, the display unit indicates that an item or an arrow that is not a correction target in the deployment table will be corrected.

11. A non-transitory computer readable medium storing a program causing a computer to execute a process for processing information, the process comprising:
  associating a deployment table and a relations diagram with each other;
  associating an axis item, which is an item included in an axis of the deployment table, and an item in the relations diagram with each other;
  associating cause-and-effect information indicating a cause-and-effect relationship between two axis items of adjacent axes of the deployment table and an arrow connecting items to each other in the relations diagram with each other; and
  displaying a relations diagram associated with a deployment table that is a correction target.

12. An information processing apparatus comprising:
  first association means for associating a deployment table and a relations diagram with each other;
  second association means for associating an axis item, which is an item included in an axis of the deployment table, and an item in the relations diagram with each other;
  third association means for associating cause-and-effect information indicating a cause-and-effect relationship between two axis items of adjacent axes of the deployment table and an arrow connecting items to each other in the relations diagram with each other; and
  display means for displaying, using at least one of the first to third association means, a relations diagram associated with a deployment table that is a correction target.

* * * * *